United States Patent
Wu et al.

(10) Patent No.: US 12,463,301 B2
(45) Date of Patent: Nov. 4, 2025

(54) THREE-TAB LAMINATED COMPOSITE BATTERY

(71) Applicant: ZHUHAI COSMX BATTERY CO., LTD., Zhuhai (CN)

(72) Inventors: Peng Wu, Zhuhai (CN); Suli Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 483 days.

(21) Appl. No.: 17/988,243

(22) Filed: Nov. 16, 2022

(65) Prior Publication Data
US 2023/0282949 A1    Sep. 7, 2023

Related U.S. Application Data

(63) Continuation of application No. PCT/CN2021/099782, filed on Jun. 11, 2021.

(51) Int. Cl.
*H01G 11/06* (2013.01)
*H01G 11/12* (2013.01)
(Continued)

(52) U.S. Cl.
CPC ............ *H01M 50/54* (2021.01); *H01G 11/06* (2013.01); *H01G 11/12* (2013.01); *H01G 11/50* (2013.01);
(Continued)

(58) Field of Classification Search
CPC ............ H01M 50/54; H01M 10/0525; H01M 10/0585; H01G 11/06; H01G 11/12; H01G 11/50
See application file for complete search history.

(56) References Cited

U.S. PATENT DOCUMENTS 6,187,061 B1    2/2001   Amatucci et al.
2003/0035982 A1   2/2003   Ryu et al.
(Continued)

FOREIGN PATENT DOCUMENTS

CN       102696144 A    9/2012
CN       104008893 A    8/2014
(Continued)

OTHER PUBLICATIONS

International Search Report and Written Opinion issued in corresponding PCT Application No. PCT/CN2021/099782, dated Sep. 1, 2021.
(Continued)

*Primary Examiner* — Sarah A. Slifka
(74) *Attorney, Agent, or Firm* — Westbridge IP LLC

(57) ABSTRACT

Disclosed is a three-tab laminated composite battery, where the positive electrode plate and the negative electrode plate are alternately stacked, and adjacent plates are separated by the separator; the positive electrode plate comprises a first positive electrode plate and a second positive electrode plate; the first positive electrode plate comprises a first positive electrode current collector and a supercapacitor positive electrode material arranged on both sides; the second positive electrode plate comprises a second positive electrode current collector and a lithium-ion battery positive electrode material arranged on both sides; the first and the second positive electrode plates are connected to a first and a second positive electrode tab respectively and independent of each other; and the negative electrode plate is connected to a negative electrode tab. The composite battery has the advantages of a lithium ion battery and a supercapacitor, and could avoid a self-discharging effect.

20 Claims, 4 Drawing Sheets

(51) Int. Cl.
*H01G 11/50* (2013.01)
*H01M 10/0525* (2010.01)
*H01M 10/0585* (2010.01)
*H01M 50/54* (2021.01)

(52) U.S. Cl.
CPC ... *H01M 10/0525* (2013.01); *H01M 10/0585* (2013.01)

(56) References Cited

U.S. PATENT DOCUMENTS

2012/0276421 A1 11/2012 Aihara et al.
2013/0224533 A1 8/2013 Zhu et al.

FOREIGN PATENT DOCUMENTS

| CN | 104466259 A | 3/2015 |
| CN | 209691893 U | 11/2019 |
| CN | 110729529 A | 1/2020 |
| CN | 111916816 A | 11/2020 |
| CN | 111916842 A | 11/2020 |
| JP | 2002118036 A | 4/2002 |
| JP | 2004355823 A | 12/2004 |

OTHER PUBLICATIONS

European Search Report issued in counterpart European Patent Application No. EP 21833847.3, dated Jul. 23, 2024.

THREE-TAB LAMINATED COMPOSITE BATTERY

CROSS-REFERENCE TO RELATED APPLICATIONS

This application is a continuation of International Application No. PCT/CN2021/099782, filed on Jun. 11, 2021, which claims priority to Chinese Application No. 202010615092.X, filed on Jun. 30, 2020, the disclosure of which is hereby incorporated by reference in its entirety.

TECHNICAL FIELD

The present application relates to the technical field of lithium-ion batteries, in particular, to a three-tab laminated type composite battery.

BACKGROUND

In recent years, with the rise and development of electric vehicles, electric bicycles, high-power start-stop equipment and other fields, there is an increasing demand for power supplies with both high energy density and high power density. lithium-ion batteries have the advantages of large specific energy, high operating voltage, environmental friendliness, and no memory effect, but their power density is often only a fraction or even less than one-tenth of that of supercapacitor batteries, and the capacity efficiency at lower temperatures is low.

In contrast, supercapacitor batteries have short charge-discharge time, and can reach 95% of their rated capacity within 1 second to 10 minutes of charging; have good ultra-low temperature characteristics, wide normal operating temperature range of $-40°$ C.$\sim+70°$ C.; have high current discharge capability and a power density of 300-10000 W/Kg, which is equivalent to several times or even dozens of times that of lithium-ion batteries. Now, supercapacitors are widely used in high current, data backup, hybrid vehicles and other fields. However, at the same time, its energy density is not high, only a fraction or even less than one-tenth of the energy density of lithium-ion batteries, which seriously limits its application in many fields with high energy density requirements.

Therefore, developing a composite battery with the advantages of both lithium-ion batteries and supercapacitors, as well as high power and energy density, good rate characteristics, high cycle efficiency, long service life, and low unit power cost is vital to industrial applications and development.

SUMMARY

The purpose of the present application is to prepare a new type of battery that combines the advantages of lithium-ion batteries and supercapacitors.

After research, the inventor found that the combination of the positive electrode plate for a lithium-ion battery and the positive electrode plate for a supercapacitor are used as the positive electrode of the composite battery and two positive electrode tabs are respectively drawn out, and then used in combination with the negative electrode plate to form a three-tab composite battery with a predetermined combination of different lithium-ion battery properties and supercapacitor properties. This combination of positive electrode plate for a lithium-ion battery and positive electrode plate for a supercapacitor can be adjusted by simply changing the number of positive electrode plates for a lithium-ion battery and positive electrode plates for a supercapacitor to achieve different mass energy densities (Wh/kg) and mass power density (W/kg) in hybrid batteries. The composite battery can better adapt to the use of different environments, and has both the high energy density of lithium-ion batteries and the high power density of supercapacitors. The unique arrangement of the three-tab enables the composite battery to have a much smaller self-discharge effect than the supercapacitor and the composite battery of the lithium-ion battery and the supercapacitor in the prior art, and the composite batteries of the embodiments of the present application can realize different modes of power management for lithium-ion batteries and supercapacitors to better leverage their respective strengths.

To achieve the above object, the technical scheme adopted by the present application is as follows:

The embodiment of the present application provides a three-tab laminated composite battery, including a positive electrode plate, a negative electrode plate, a separator and an electrolyte; the positive electrode plate and the negative electrode plate are alternately stacked, and adjacent positive electrode plate and negative electrode plate are separated by the separator; the positive electrode plate includes a first positive electrode plate and a second positive electrode plate; the first positive electrode plate includes a first positive electrode current collector and a positive electrode material for a supercapacitor arranged on both sides of the first positive electrode current collector; the second positive electrode plate includes a second positive electrode current collector and a positive electrode material for a lithium-ion battery arranged on both sides of the second positive electrode current collector; the first positive electrode plate is connected to a first positive electrode tab; the second positive electrode plate is connected to a second positive tab; the first positive electrode tab and the second positive electrode tab are independent of each other; and the negative electrode plate is connected to a negative electrode tab.

According to the present application, the positive electrode plate further includes a third positive electrode plate, and the third positive electrode plate includes a third positive electrode current collector, a positive electrode material for a lithium-ion battery arranged on a first surface of the third positive electrode current collector, and a positive electrode material for a supercapacitor arranged on a second surface of the positive electrode current collector opposite to the first surface; and the third positive electrode plate is connected to the first positive electrode tab or the second positive electrode tab.

According to the present application, the positive electrode plate further includes a fourth positive electrode plate, and the fourth positive electrode plate includes a fourth positive electrode current collector and a positive electrode material for a supercapacitor arranged on one surface of the fourth positive electrode current collector; and the fourth positive electrode plate is arranged on the outermost layer of the composite battery, and the fourth positive electrode plate is connected to the first positive electrode tab.

According to the present application, the positive electrode plate further includes a fifth positive electrode plate, and the fifth positive electrode plate includes a fifth positive electrode current collector and a positive electrode material for a lithium-ion battery arranged on one surface of the fifth positive electrode current collector; the fifth positive electrode plate is arranged on the outermost layer of the composite battery, and the fifth positive electrode plate is connected to the second positive electrode tab.

According to the present application, the negative electrode plate includes a first negative electrode plate; the first negative electrode plate includes a first negative electrode current collector and a bifunctional negative electrode material arranged on both sides of the first negative electrode current collector; the bifunctional negative electrode material can adsorb/desorb lithium-ions, and can intercalate/de-intercalate lithium-ions of a lithium-ion battery.

According to the present application, the negative electrode plate includes a second negative electrode plate, and the second negative electrode plate includes a second negative electrode current collector and a bifunctional negative electrode material arranged on one side of the second negative electrode current collector; the bifunctional negative electrode material can adsorb/desorb lithium-ions, and can intercalate/de-intercalate lithium-ions of a lithium-ion battery; and the second negative electrode plate is arranged on the outermost layer of the composite battery.

According to the present application, the negative electrode plate includes a third negative electrode plate, and the third negative electrode plate includes a third negative electrode current collector and negative electrode materials for supercapacitors arranged on both sides of the third negative electrode current collector.

According to the present application, the negative electrode plate includes a fourth negative electrode plate, and the fourth negative electrode plate includes a fourth negative electrode current collector and a negative electrode material for a supercapacitor arranged on one side of the fourth negative electrode current collector; and the fourth negative electrode plate is arranged on the outermost layer of the composite battery.

According to the present application, the negative electrode plate includes a fifth negative electrode plate, and the fifth negative electrode plate includes a fifth negative electrode current collector and negative electrode materials for a lithium-ion batteries arranged on both sides of the fifth negative electrode current collector.

According to the present application, the negative electrode plate includes a sixth negative electrode plate, and the sixth negative electrode plate includes a sixth negative electrode current collector and a negative electrode material for a lithium-ion battery arranged on one side of the sixth negative electrode current collector; and the sixth negative electrode plate is arranged on the outermost layer of the composite battery.

According to the present application, the negative electrode plate includes a seventh negative electrode plate; the seventh negative electrode plate includes a seventh negative electrode current collector, a first negative electrode material arranged on a first surface of the seventh negative electrode current collector, and a second negative electrode material on a second surface of the seventh negative electrode current collector opposite to the first surface; the first negative electrode material and the second negative electrode material both are one selected from the group consisting of the bifunctional negative electrode materials, the negative electrode material for a supercapacitor and the negative electrode material for a lithium-ion battery; the first negative electrode material is different from the second negative electrode material; and the bifunctional negative electrode material can adsorb/desorb lithium-ions, and can intercalate/de-intercalate lithium-ions of a lithium-ion battery.

The three-tab laminated composite battery according to the embodiment of the present application has at least the following beneficial effects:

(1) The composite battery of the embodiment of the present application not only has the advantages of high energy density, high average output voltage, high charging efficiency, low self-discharge efficiency, good safety performance, long cycle and service life of lithium-ion battery as well as the advantages of stable performance, short charge and discharge time, long cycle life, and high power density of supercapacitors.

(2) In the composite battery of the embodiment of the present application, the positive electrode of a lithium-ion battery and the positive electrode of a supercapacitor are independently connected to two positive electrode tabs, which reduces the self-discharge effect of such composite batteries in the prior art. The composite battery in the prior art has only one positive electrode tab. Due to the serious self-discharge defect of the supercapacitor, when the electric energy stored in the supercapacitor is consumed due to self-discharge, there is only one positive electrode tab directly connected to the positive electrode of the lithium-ion battery, at this time, the electric energy stored in the lithium-ion battery will continue to be weakly discharged through the supercapacitor, and finally the self-discharge effect of the entire composite battery is too large and affects normal use. The present application uses two independent positive electrode tabs and substantially reduced this phenomenon.

(3) The composite battery of the embodiment of the present application adopts two independent positive electrode tabs, which can select different charging systems and voltages for the lithium-ion positive electrode and the supercapacitor positive electrode of the composite battery to ensure its energy density and power density to achieve compatibility that is difficult to achieve with the existing common technology, so that the battery can achieve the best performance, and can use different modes for power management of lithium-ion batteries and supercapacitors according to actual needs, so as to better play their respective advantages. And the traditional single-positive electrode tab cannot achieve this function.

DETAILED DESCRIPTIONS OF THE EMBODIMENTS

Figure 1:
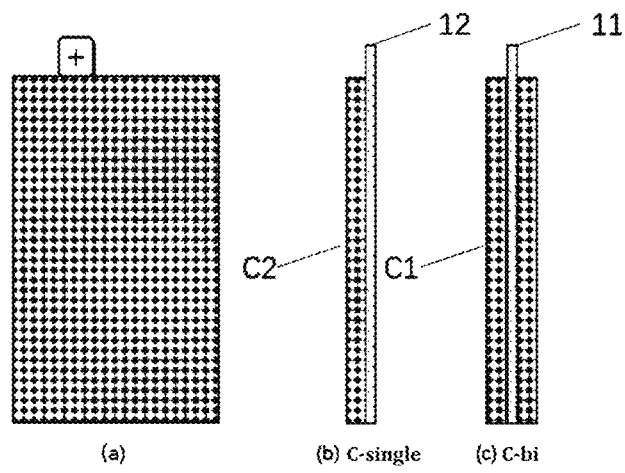
FIG. 1 is a schematic diagram of a positive electrode plate for a supercapacitor according to an example of the present application, (a) is a front view of a positive electrode plate for a supercapacitor, (b) and (c) are side views, and 11 is a first positive electrode current collector, 12 is a fourth positive electrode current collector, and the surfaces of the positive electrode current collectors are coated with positive electrode materials for supercapacitors (the shaded part in the figure).

In order to make the objectives, technical solutions and advantages of the present application clearer, the present application will be further described in detail below with reference to specific examples and accompanying drawings. However, those skilled in the art know that the present application is not limited to the accompanying drawings and the following examples. As used herein, the term of "including" and its various variants can be understood as open-ended terms meaning "including but not limited to". The terms of "first", "second" and similar expressions are only used to represent different technical features and have no substantial meaning.

<Composite Battery>

In one embodiment of the present application, the three-tab laminated composite battery of the example of the present application includes a positive electrode plate, a negative electrode plate, a separator and an electrolyte; the positive electrode plate and the negative electrode plate are alternately stacked, and adjacent positive electrode plate and negative electrode plate are separated by a separator; the positive electrode plate includes a first positive electrode plate and a second positive electrode plate; the first positive electrode plate includes a first positive electrode current collector and a positive electrode material for a supercapacitor arranged on both sides of the first positive electrode current collector; the second positive electrode plate includes a second positive electrode current collector and a positive electrode material for a lithium-ion battery arranged on both sides of the second positive electrode current collector; the first positive electrode plate is connected to a first positive electrode tab; the second positive electrode plate is connected to a second positive tab; the first positive electrode tab and the second positive electrode tab are independent of each other; and the negative electrode plate is connected to a negative electrode tab.

In one embodiment of the present application, the positive electrode plate further includes a third positive electrode plate, and the third positive electrode plate includes a third positive electrode current collector, a positive electrode material for a lithium-ion battery arranged on a first surface of the third positive electrode current collector, and a positive electrode material for a supercapacitor arranged on a second surface of the positive electrode current collector opposite to the first surface; and the third positive electrode plate is connected to the first positive electrode tab or the second positive electrode tab.

In one embodiment of the present application, the positive electrode plate further includes a fourth positive electrode plate, and the fourth positive electrode plate includes a fourth positive electrode current collector and a positive electrode material for a supercapacitor arranged on one surface of the fourth positive electrode current collector; and the fourth positive electrode plate is arranged on the outermost layer of the composite battery, and the fourth positive electrode plate is connected to the first positive electrode tab.

In one embodiment of the present application, the positive electrode plate further includes a fifth positive electrode plate, and the fifth positive electrode plate includes a fifth positive electrode current collector and a positive electrode material for a lithium-ion battery arranged on one surface of the fifth positive electrode current collector; the fifth positive electrode plate is arranged on the outermost layer of the composite battery, and the fifth positive electrode plate is connected to the second positive electrode tab.

In one embodiment of the present application, the negative electrode plate includes a first negative electrode plate; the first negative electrode plate includes a first negative electrode current collector and a bifunctional negative electrode material arranged on both sides of the first negative electrode current collector; the bifunctional negative electrode material can adsorb/desorb lithium-ions, and can intercalate/de-intercalate lithium-ions of a lithium-ion battery.

In one embodiment of the present application, the negative electrode plate includes a second negative electrode plate, and the second negative electrode plate includes a second negative electrode current collector and a bifunctional negative electrode material arranged on one side of the second negative electrode current collector; the bifunctional negative electrode material can adsorb/desorb lithium-ions, and can intercalate/de-intercalate lithium-ions of a lithium-ion battery; and the second negative electrode plate is arranged on the outermost layer of the composite battery.

In one embodiment of the present application, the negative electrode plate includes a third negative electrode plate, and the third negative electrode plate includes a third negative electrode current collector and negative electrode materials for supercapacitors arranged on both sides of the third negative electrode current collector.

In one embodiment of the present application, the negative electrode plate includes a fourth negative electrode plate, and the fourth negative electrode plate includes a fourth negative electrode current collector and a negative electrode material for a supercapacitor arranged on one side of the fourth negative electrode current collector; and the fourth negative electrode plate is arranged on the outermost layer of the composite battery.

In one embodiment of the present application, the negative electrode plate includes a fifth negative electrode plate, and the fifth negative electrode plate includes a fifth negative electrode current collector and negative electrode materials for a lithium-ion batteries arranged on both sides of the fifth negative electrode current collector.

In one embodiment of the present application, the negative electrode plate includes a sixth negative electrode plate, and the sixth negative electrode plate includes a sixth negative electrode current collector and a negative electrode material for a lithium-ion battery arranged on one side of the sixth negative electrode current collector; and the sixth negative electrode plate is arranged on the outermost layer of the composite battery.

In an embodiment of the present application, the negative electrode plate includes a seventh negative electrode plate; the seventh negative electrode plate includes a seventh negative electrode current collector, a first negative electrode material arranged on a first surface of the seventh negative electrode current collector, and a second negative electrode material on a second surface of the seventh negative electrode current collector opposite to the first surface; the first negative electrode material and the second negative electrode material both are one selected from the group consisting of the bifunctional negative electrode materials, the negative electrode material for a supercapacitor and the negative electrode material for a lithium-ion battery; the first negative electrode material is different from the second negative electrode material; and the bifunctional negative electrode material can adsorb/desorb lithium-ions, and can intercalate/de-intercalate lithium-ions of a lithium-ion battery.

<Positive Plate for Supercapacitor>

In one embodiment of the present application, the three-tab laminated composite battery of the example of the present application includes a positive electrode plate, and the positive electrode plate includes a first positive electrode plate C1, and the first positive electrode plate C1 is a positive electrode plate for a supercapacitor, the first positive electrode plate C1 includes a first positive electrode current collector for a supercapacitor and a positive electrode material for a supercapacitor arranged on both sides of the first positive electrode current collector.

Preferably, the positive electrode plate in the example of the present application further includes a fourth positive electrode plate C2, the fourth positive electrode plate C2 is a positive electrode plate for a supercapacitor, and the fourth positive electrode plate C2 includes a fourth positive electrode current collector for a supercapacitor and a positive electrode material for a supercapacitor on the surface of one side of the four positive electrode current collectors. Only one side of the fourth positive electrode plate C2 is provided with a positive electrode material for a supercapacitor, and the fourth positive electrode plate C2 can be used as the outermost positive electrode plate of the composite battery.

As shown in FIG. 1, the fourth positive electrode plate C2 for a supercapacitor coated with a positive electrode material for a supercapacitor on one surface of the fourth positive electrode current collector is defined as C-single ((b) in FIG. 1); The first positive electrode plate C1 for a supercapacitor coated with a positive electrode material for a supercapacitor on both surfaces of the first positive electrode current collector for a supercapacitor is defined as C-bi ((c) in FIG. 1). The purpose of arranging the first positive electrode plate C1 and the fourth positive electrode plate C2 for the supercapacitor is to form a supercapacitor positive and negative electrode pair with the matched negative electrode plate F1, F2 or F3, so as to realize the storage of electric energy by the supercapacitor lamination unit. In addition, C-single and C-bi are mainly used in different structures to maximize the utilization of active materials, where C-single is mainly used in the lamination unit of the outermost supercapacitor, and C-bi is mainly used in the lamination unit of non-outermost supercapacitor.

In one example, the first positive electrode current collector and the fourth positive electrode current collector for the supercapacitor are both selected from aluminum foils.

The positive electrode material for a supercapacitor includes a positive electrode active material for a supercapacitor, a positive electrode binder for a supercapacitor, and a positive electrode conductive agent for a supercapacitor.

In some examples, the compaction density of the first positive electrode plate and the fourth positive electrode plate for a supercapacitor is 0.5-4.3 g/cm$^3$.

In some examples, the positive electrode active material for a supercapacitor accounts for 70-99% of the total mass of the positive electrode material for a supercapacitor, the positive electrode conductive agent for a supercapacitor accounts for 0.5-15% of the total mass of the positive electrode material for the supercapacitor, and the positive electrode binder for supercapacitor accounts for 0.5-15% of the total mass of the positive electrode material for a supercapacitor.

In some examples, the positive electrode active material for a supercapacitor is at least one selected from the group consisting of activated porous carbon materials (activated carbon powder, activated carbon fiber, carbon aerogel, carbon nanotube, carbide-derived carbon, graphite ring, graphene oxide, graphene etc.); metal oxides (such as $RuO_2$, $MnO_2$, $ZnO$, $PbO_2$, $WO_3$, $NiO$, $Co_3O_4$, $MoO_2$, etc.); metal sulfides (such as $MnS_2$, $PbO_2$, $WS_3$, $NiS$, $MoS_2$, $TiS_2$, $FeS$, $FeS_2$, etc.); mixed metal oxides (such as $NiCo_2O_4$, $ZnCo_2O_4$, $FeCo_2O_4$, $MnCo_2O_4$, $CoNi_2O_4$, $ZnNi_2O_4$, etc.); mixed metal sulfides (such as $NiCo_2S_4$, $ZnCo_2S_4$, $FeCo_2S_4$, $MnCo_2S_4$, $CoNi_2S_4$, $ZnNi_2S_4$ etc.) and conductive polymers (such as poly(3-methyl-thiophene), polyaniline, polypyrrole, polyparaphenylene, polyacene, polythiophene and polyacetylene, etc.).

In some examples, the positive electrode binder for a supercapacitor may be polymer materials, including but not limited to polyvinylidene fluoride and polyimide.

In some examples, the positive electrode conductive agent for a supercapacitor may be at least one of conductive carbon black, acetylene black, Ketjen black, carbon nanotubes and graphene.

<Lithium-Ion Battery Positive Electrode Plate>

In one embodiment of the present application, the positive electrode plate of the composite battery according to the example of the present application further includes a second positive electrode plate L1, the second positive electrode plate L1 is a positive electrode plate for a lithium-ion battery, and the second positive electrode plate L1 includes a second positive electrode current collector for a lithium-ion battery and a positive electrode material for a lithium-ion battery arranged on both sides of the second positive electrode current collector for a lithium-ion battery.

Preferably, the positive electrode plate in the example of the present application further includes a fifth positive electrode plate L2, the fifth positive electrode plate L2 is a positive electrode plate for a lithium-ion battery, and the fifth positive electrode plate L2 includes a fifth positive electrode current collector for a lithium-ion battery and a positive electrode material for a lithium-ion battery on one side of the fifth positive electrode current collector. Only one side of the fifth positive electrode plate L2 is provided with a positive electrode material for a lithium-ion battery, and the fifth positive electrode plate L2 can be used as the outermost positive electrode plate of the composite battery.

Figure 2:
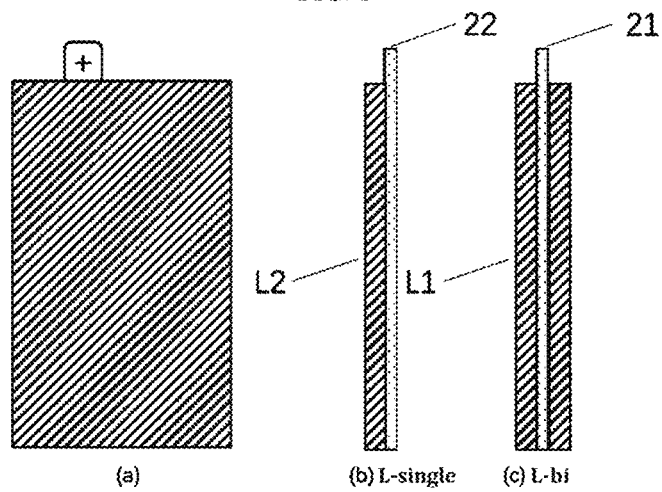
FIG. 2 is a schematic diagram of a positive electrode plate for a lithium-ion battery according to an example of the present application, (a) is a front view of the positive electrode plate for a lithium-ion battery, (b) and (c) are side views, and 21 is a second positive electrode current collector, 22 is a fifth positive electrode current collector, and the surfaces of the positive electrode current collectors are coated with positive electrode materials for lithium-ion batteries (the shaded part in the figure).

As shown in FIG. 2, the fifth positive electrode plate L2 for a lithium-ion battery coated with the positive electrode material for a lithium-ion battery on one side of the fifth positive electrode current collector for a lithium-ion battery is defined as L-single ((b) in FIG. 2); the second lithium-ion battery positive electrode plate L1 is coated with positive electrode material for a lithium-ion battery on both sides of the second positive electrode current collector for a lithium-ion battery is defined as L-bi ((c) in FIG. 2). The purpose of arranging the second positive electrode plate L1 and the fifth positive electrode plate L2 for the lithium-ion battery is to form a positive and negative electrode pair of the lithium-ion battery with the matched negative electrode plates F1 and F2, so as to realize the intercalation and deintercalation of the lithium-ions during charging and discharging and to form the lamination unit of the lithium-ion battery. In addition, L-single and L-bi are mainly used in different structures to maximize the utilization of active materials, in which L-single is mainly used in the lamination unit of the outermost lithium-ion battery, and L-bi is mainly used in the lamination unit of the non-outermost layer of the lithium-ion battery.

In one example, the second positive electrode current collector and the fifth positive electrode current collector for the lithium-ion battery are selected from aluminum foils.

The positive electrode material for a lithium-ion battery includes a positive electrode active material for a lithium-ion battery, a positive electrode binder for a lithium-ion battery, and a positive electrode conductive agent for a lithium-ion battery.

In some examples, the compaction densities of the second positive electrode plate and the fifth positive electrode plate for a lithium-ion battery are both 2-4.3 g/cm$^3$.

In some examples, the positive electrode active material for a lithium-ion battery accounts for 75-99% of the total mass of the positive electrode material for the lithium-ion battery, and the positive electrode conductive agent for a lithium-ion battery accounts for 0.5-15% of the total mass of the positive electrode material for the lithium-ion battery, the positive electrode binder for a lithium-ion battery accounts for 0.5-10% of the total mass of the positive electrode material for a lithium-ion battery.

In some examples, the positive electrode active material for the lithium-ion battery is selected from lithium iron phosphate ($LiFePO_4$), lithium nickel cobalt manganate ($Li_zNi_xCo_yAl_{1-x-y}O_2$, $0.95 \leq z \leq 1.05$, $x>0$, $y>0$, $x+y<1$), lithium nickel cobalt aluminate ($Li_zNi_xCo_yAl_{1-x-y}O_2$, where $0.95 \leq z \leq 1.05$, $x>0$, $y>0$, $0.8 \leq x+y<1$), lithium nickel cobalt oxide ($LiNi_xCo_yO_2$, where $x>0$, $y>0$, $x+y=1$), lithium nickel titanium magnesium oxide ($LiNi_xTi_yMg_zO_2$, where $x>0$, $y>0$, $z>0$, $x+y+z=1$), lithium nickel cobalt manganese aluminate ($Li_zNi_xCo_yMn_wAl_{1-x-y-w}O_2$, where $0.95 \leq z \leq 1.05$, $x>0$, $y>0$, $w>0$, $0.8 \leq x+y+w<1$), lithium titanate ($LiTiO_2$), layered lithium manganate ($LiMnO_2$), lithium nickelate ($Li_2NiO_2$), lithium spinel manganate ($LiMn)_2O_4$), lithium-rich manganese-based solid solution cathode material $xLi_2MnO_3 \cdot (1-x)LiMO_2$, where M=Ni or Co or Mn.

Exemplarily, the nickel-cobalt-manganese ternary composite cathode material is at least one selected from the group consisting of $LiNi_{1/3}Co_{1/3}Mn_{1/3}$, $LiNi_{0.5}Co_{0.2}Mn_{0.3}$, $LiNi_{0.4}Co_{0.2}Mn_{0.4}$, $LiNi_{0.6}Co_{0.2}Mn_{0.2}$, $LiNi_{0.8}Co_{0.1}Mn_{0.1}$, $LiNi_{0.7}Co_{0.2}Mn_{0.1}$, $LiNi_{0.7}Co_{0.15}Mn_{0.15}$ and $LiNi_xCo_yMn_{1-x-y}O_2$ (where $0.95 \leq z \leq 1.05$, $0.8 \leq x \leq 0.95$, $0.03 \leq x \leq 0.2$, $x+y<1$).

In some examples, the positive electrode binder for a lithium-ion battery may be a polymer material, including but not limited to polyvinylidene fluoride and polyimide.

In some examples, the positive electrode conductive agent for a lithium-ion battery may be at least one selected from the group consisting of conductive carbon black, acetylene black, Ketjen black, carbon nanotubes, graphene oxide, and graphene.

<Positive Electrode Plate for a Lithium-Ion Battery and a Supercapacitor>

In one embodiment of the present application, the positive electrode plate further includes a third positive electrode plate H, and the third positive electrode plate H is a positive electrode plate for a lithium-ion battery and a supercapacitor, including a third positive electrode current collector for a lithium-ion battery and a supercapacitor, a positive electrode material for a lithium-ion battery arranged on the first surface of the third positive electrode current collector for a lithium-ion battery and a supercapacitor and a positive electrode material for a supercapacitor arranged on a second surface of the third positive electrode current collector for a lithium-ion battery and a supercapacitor opposite to the first surface.

Figure 3:
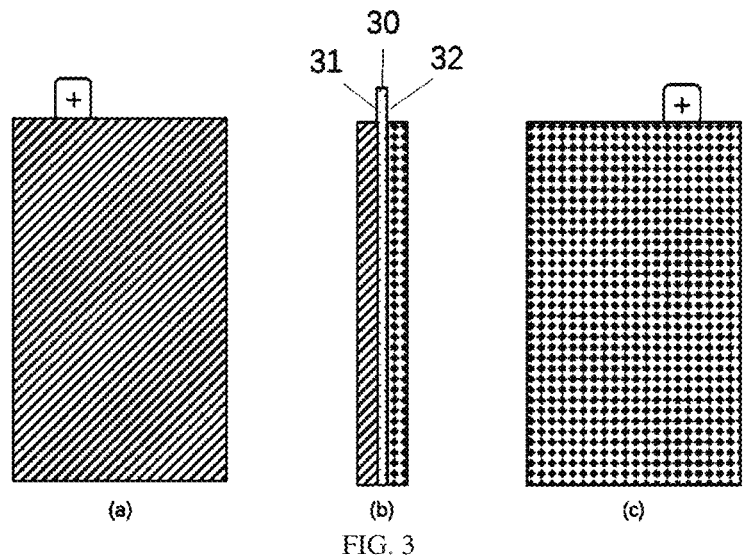
FIG. 3 is a schematic diagram of a positive electrode plate for a lithium-ion battery and a supercapacitor according to an example of the present application, (a) is a front view of the positive electrode plate in the first direction, (b) is a side view, and (c) is a front view of the positive electrode plate in the opposite direction to the first direction, 30 is the third positive current collector, the first surface 31 of the third positive current collector is coated with the positive electrode material of a lithium-ion battery (the shaded part in the figure), the second surface 32 of the third positive current collector is coated with a positive electrode material for a supercapacitor (the shaded part in the figure).

As shown in FIG. 3, the first surface of the third positive electrode current collector for a lithium-ion battery and a supercapacitor is coated with positive electrode material for a lithium-ion battery, and the second surface opposite to the first surface is coated with positive electrode material for a supercapacitor to form a third positive electrode plate H for a lithium-ion battery and a supercapacitor; wherein the third positive electrode plate H for a lithium-ion battery and a supercapacitor can be used as a transitional positive electrode plate, and one side of the third positive electrode plate H for a lithium-ion battery and a supercapacitor can form a lithium-ion battery lamination unit, and the other side can form a supercapacitor lamination unit, realizing the transition between lithium-ion batteries and supercapacitors. The third positive electrode can be connected to the first positive electrode tab or the second positive electrode tab. When there are multiple third positive electrode tabs in the composite battery, they can be connected to the same positive electrode tab or to different positive electrode tabs.

In one example, the third current collector for a lithium-ion battery and a supercapacitor is selected from aluminum foils.

The definition of the positive electrode material for the lithium-ion battery is the same as above.

The definition of the positive electrode material for a supercapacitor is the same as above.

<Compatible Negative Electrode>

In one embodiment of the present application, the negative electrode plate of the composite battery includes a first negative electrode plate F1, and the first negative electrode plate F1 includes a first negative electrode current collector and the bifunctional negative electrode material arranged on both sides of the first negative electrode current collector. The bifunctional negative electrode material can not only adsorb/desorb lithium-ions, but also be capable of intercalating/de-intercalating lithium-ions of a lithium-ion battery. The bifunctional negative electrode material has bi properties, so that the first negative electrode plate can be used not only as a negative electrode plate for a supercapacitor, but also as a negative electrode plate for a lithium-ion battery, that is, the first negative electrode plate is a compatible negative electrode plate.

Preferably, the negative electrode plate further includes a second negative electrode plate F2, and the second negative electrode plate F2 includes a second negative electrode current collector and a bifunctional negative electrode material arranged on one side of the second negative electrode current collector. Only one side of the second negative electrode plate F2 is provided with a bifunctional negative electrode material, and the second negative electrode plate F2 can be used as the outermost negative electrode plate of the composite battery. The second negative electrode plate is also a compatible negative electrode plate.

Figure 4:
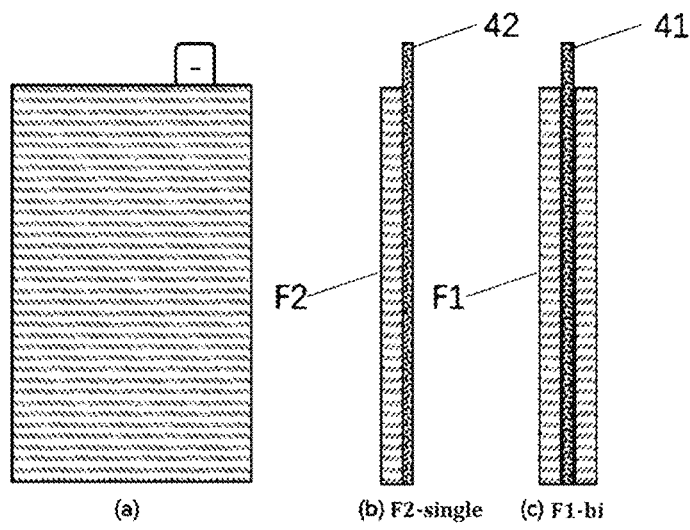
FIG. 4 is a schematic diagram of a compatible negative electrode plate according to an example of the present application, (a) is a front view of the compatible negative electrode plate, (b) and (c) are side views, and 41 is the first negative electrode current collector, 42 is the second negative electrode current collector, and the surfaces of the negative electrode current collectors are coated with bifunctional negative electrode materials (the shaded part in the figure).

As shown in FIG. 4, the second negative electrode plate F2 coated with bifunctional negative electrode material on one side of the second negative electrode current collector is defined as F2-single ((b) in FIG. 4). The first negative electrode plate F1 coated with bifunctional negative electrode material on both sides of the current collector is defined as F1-bi ((c) in FIG. 4). The first negative electrode plate F1 and the second negative electrode plate F2 can be adapted to the above-mentioned positive electrode plates L1 and L2 for a lithium-ion battery, positive electrode plates C1 and C2 for a supercapacitor, or positive electrode plates H for a lithium-ion battery and a supercapacitor, to form a lithium-ion battery lamination unit or a supercapacitor lamination unit, so that when the composite battery is charged and discharged, there are both physical energy storage of the supercapacitor and chemical energy storage of the lithium-ion battery.

In one example, the first negative electrode current collector and the second negative electrode current collector are both selected from copper foils, such as electrolytic copper foils or rolled copper foils.

The bifunctional negative electrode material includes a first negative electrode active material, a first negative electrode binder and a first negative electrode conductive agent.

In some examples, the first negative electrode active material accounts for 70-99% of the total mass of the bifunctional negative electrode material, the first negative electrode conductive agent accounts for 0.5-15% of the total mass of the bifunctional negative electrode material, and the first negative electrode material accounts for 0.5-15% of the total mass of the bifunctional negative electrode material.

In some examples, the first negative electrode active material is any material that can de-intercalate metal ions such as lithium-ions, for example, the first negative electrode active material may be at least one selected from the group consisting of graphite, silicon material, silicon carbon composite material, silicon oxide material, alloy materials and lithium-containing metal composite oxide materials.

In some examples, the first negative electrode binder includes, but is not limited to, one or more of styrene-butadiene rubber, fluorine-based rubber, ethylene propylene diene, and hydroxymethyl cellulose.

In some examples, the first negative electrode conductive agent may be at least one selected from the group consisting of conductive carbon black, acetylene black, Ketjen black, carbon nanotubes and graphene.

<Negative Electrode Plate for a Supercapacitor>

In one embodiment of the present application, the negative electrode plate includes a third negative electrode plate F3, the third negative electrode plate is a negative electrode plate for a supercapacitor, and the third negative electrode plate F3 includes a third negative electrode current collector and a negative electrode material for a supercapacitor arranged on both sides of the third negative electrode current collector.

Preferably, the negative electrode plate further includes a fourth negative electrode plate F4, the fourth negative electrode plate is a negative electrode plate for a supercapacitor, and the fourth negative electrode plate F4 includes a fourth negative electrode current collector and a negative electrode material for a supercapacitor arranged one surface of the on the fourth negative electrode current collector. Only one side of the fourth negative electrode plate F4 is provided with a negative electrode material for a supercapacitor, and the fourth negative electrode plate F4 can be used as the outermost negative electrode plate of the composite battery.

Figure 5:
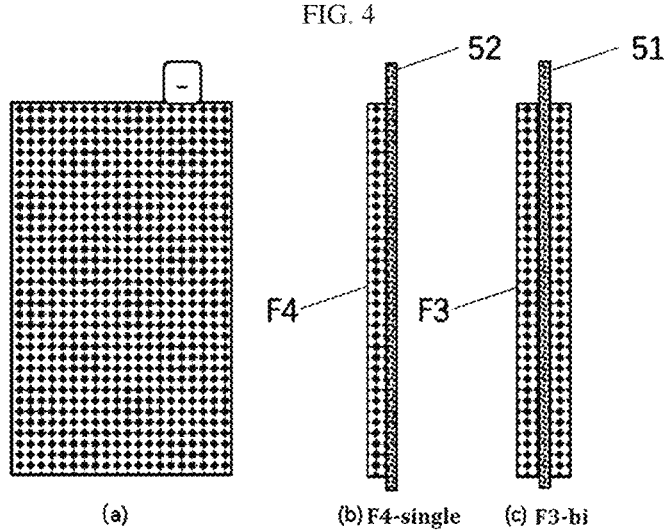
FIG. 5 is a schematic diagram of a negative electrode plate for a supercapacitor according to an example of the present application, (a) is a front view of the negative electrode plate for a supercapacitor, (b) and (c) are side views, and 51 is the third negative electrode current collector, 52 is the fourth negative electrode current collector, and the surfaces of the negative electrode current collectors are coated with a negative electrode material for supercapacitor (the shaded part in the figure).

As shown in FIG. 5, the fourth negative electrode plate F4 for a supercapacitor coated with negative electrode material for a supercapacitor on the surface of the fourth negative electrode current collector is defined as F4-single ((b) in FIG. 5); the third negative electrode plate F3 for a supercapacitor coated with a negative electrode material for a supercapacitor on both sides of the third negative electrode current collector is defined as F3-bi ((c) in FIG. 5). The third negative electrode plate F3 and the fourth negative electrode plate F4 can be matched with the above-mentioned positive electrode plates C1 and C2 for a supercapacitor, or the positive electrode plates H for a lithium-ion battery and a supercapacitor to form a supercapacitor lamination unit. In particular, when the negative electrode material for a supercapacitor of the third negative electrode plate F3 and the fourth negative electrode plate F4 and the positive electrode material for a supercapacitor of the positive electrode plate for a supercapacitor both are the same material, a symmetrical supercapacitor lamination unit can be formed. When the negative electrode material for a supercapacitor of the third negative electrode plate F3 and the fourth negative electrode plate F4 and the positive electrode material for a supercapacitor of the positive electrode plate for a supercapacitor are different materials but both are supercapacitor active materials, they can form an asymmetric supercapacitor lamination unit.

In one example, the third negative electrode current collector and the fourth negative electrode current collector are selected from copper foils, such as electrolytic copper foils or rolled copper foils.

In some examples, the negative electrode material for a supercapacitor includes a negative electrode active material for a supercapacitor, a negative electrode binder for a supercapacitor, and a negative electrode conductive agent for a supercapacitor.

In some examples, the negative electrode active material for a supercapacitor accounts for 70-99% of the total mass of the negative electrode material for a supercapacitor, the negative electrode conductive agent for a supercapacitor accounts for 0.5-15% of the total mass of the negative electrode material for a supercapacitor, and the negative electrode binder for a supercapacitor accounts for 0.5-15% of the total mass of the negative electrode material for a supercapacitor.

In some examples, the negative electrode active material for a supercapacitor is selected from activated porous carbon materials (one or more selected from activated carbon powder, activated carbon fiber, carbon aerogel, carbon nanotube, carbide-derived carbon, graphite ring, graphene oxide, graphene etc.); metal oxides (such as $RuO_2$, $MnO_2$, $ZnO$, $PbO_2$, $WO_3$, $NiO$, $Co_3O_4$, $MoO_2$, etc.); metal sulfides (such as $MnS_2$, $PbO_2$, $WS_3$, $NiS$, $MoS_2$, $TiS_2$, $FeS$, $FeS_2$, etc.); mixed metal oxides (such as $NiCo_2O_4$, $ZnCo_2O_4$, $FeCo_2O_4$, $MnCo_2O_4$, $CoNi_2O_4$, $ZnNi_2O_4$, etc.); mixed metal sulfides (such as $NiCo_2S_4$, $ZnCo_2S_4$, $FeCo_2S_4$, $MnCo_2S_4$, $CoNi_2S_4$, $ZnNi_2S_4$ etc.); conductive polymers (such as poly(3-methylthiophene), polyaniline, polypyrrole, polyparaphenylene, polyacene, polythiophene and polyacetylene, etc.).

In some examples, the negative electrode binder for a supercapacitor may be polymer materials, including but not limited to polyvinylidene fluoride and polyimide.

In some examples, the negative electrode conductive agent for a supercapacitor may be at least one selected from the group consisting of graphite, carbon black, acetylene black, Ketjen black, carbon nanotubes and graphene.

<Negative Electrode Plate for a Lithium-Ion Battery>

In one embodiment of the present application, the negative electrode plate includes a fifth negative electrode plate, the fifth negative electrode plate is a negative electrode plate for a lithium-ion battery, and the fifth negative electrode plate includes a fifth negative electrode current collector and a negative electrode material for a lithium-ion battery arranged on both sides of the negative electrode current collector.

Preferably, the negative electrode plate further includes a sixth negative electrode plate, the sixth negative electrode plate is a negative electrode plate for a lithium-ion battery, and the sixth negative electrode plate includes a sixth negative electrode current collector and a negative electrode material for a supercapacitor arranged on one side of the sixth negative electrode current collector. Only one side of the sixth negative electrode plate is provided with a negative electrode material for a lithium-ion battery, and the sixth negative electrode plate can be used as the outermost negative electrode plate of the composite battery.

The structures of the fifth negative electrode plate and the sixth negative electrode plate are respectively as same as those of the third negative electrode plate and the fourth negative electrode plate, and only the negative electrode materials are different. The fifth negative electrode plate and the sixth negative electrode plate can be matched with the above-mentioned positive electrode plates L1 and L2 for a lithium-ion battery, or positive electrode plates H for a lithium-ion battery and a supercapacitor to form a lithium-ion battery structural unit. There are many kinds of negative electrode materials for a lithium-ion battery, and those skilled in the art can select suitable negative electrode materials for a lithium-ion battery in the prior art according to actual needs.

In one example, the fifth negative electrode current collector and the sixth negative electrode current collector are both selected from copper foils, such as electrolytic copper foils or rolled copper foils.

<Transition Negative Electrode Plate>

In one embodiment of the present application, the negative electrode plate further includes a seventh negative electrode plate F5, the seventh negative electrode plate is a transitional negative electrode plate, and the seventh negative electrode plate F5 includes a seventh negative electrode current collector and a first negative electrode material on the first surface of the negative electrode current collector, and the second negative electrode material on the second surface of the seventh negative electrode current collector opposite to the first surface, the first negative electrode material and the second negative electrode material are both one selected from the above-mentioned bifunctional negative electrode material, the negative electrode material for a supercapacitor and the negative electrode material for a lithium-ion battery, the first negative electrode material is different from the second negative electrode material.

Figure 6:
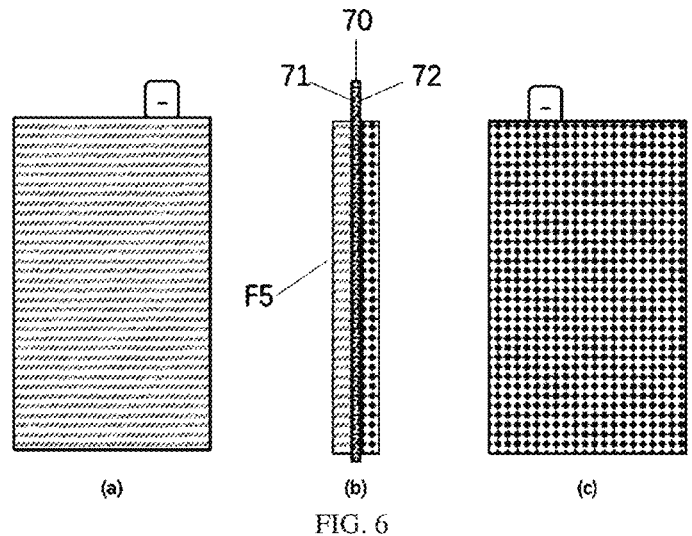
FIG. 6 is a schematic diagram of a transition negative electrode plate according to an example of the present application, (a) is a front view of the negative electrode plate in the first direction, (b) is a side view, and (c) is a front view of the negative electrode plate in the direction opposite to the first direction, 70 is the seventh negative electrode current collector, the first surface 71 of the seventh negative electrode current collector is coated with the negative electrode material of the lithium-ion battery (one shaded part in the figure), and the second surface 72 of the seventh negative electrode current collector is coated with negative electrode material for a supercapacitor (the other shaded part in the figure).

Exemplarily, as shown in FIG. 6, a negative electrode material for a lithium-ion battery is coated on the first surface of the fifth negative electrode current collector, and a negative electrode material for a supercapacitor is coated on a second surface of the fifth negative electrode current collector opposite to the first surface. The first surface side of the seventh negative electrode plate F5 can be adapted with the above-mentioned positive electrode plates L1 and L2 for a lithium-ion battery, and the positive electrode plates H for a lithium-ion battery and a supercapacitor, and the second surface side can be matched with the positive electrode plate C1 and C2 for a supercapacitor. Therefore, the seventh negative electrode plate F5 can be used as a transitional negative electrode plate, forming a lithium-ion battery lamination unit on one side, and a supercapacitor lamination unit on the other side, so that when the composite battery is charged and discharged, there are two ways of physical energy storage of a supercapacitor and chemical energy storage of a lithium-ion battery.

The seventh negative electrode current collector is selected from copper foil, such as electrolytic copper foil or rolled copper foil.

The definitions of the bifunctional negative electrode material, the negative electrode material for a supercapacitor and the negative electrode material for a lithium-ion battery are as described above.

<Lithium-Ion Battery Lamination Unit>

Exemplarily, in one embodiment of the present application, the positive electrode plate for a lithium-ion battery L1, the separator and the compatible negative electrode plate F1 can form a lithium-ion battery lamination unit A1, and the lithium-ion battery lamination unit A1 contains a lithium-ion battery cell structure Y1 formed by positive electrode material for a lithium-ion battery, separator and negative electrode material for a lithium-ion battery. The compatible negative electrode plate F1 can also be replaced by a negative electrode plate for a lithium-ion battery.

<Supercapacitor Lamination Unit>

Exemplarily, in one solution of the present application, the positive electrode plate for a supercapacitor C1, the separator and the compatible negative electrode plate F1 can form a supercapacitor lamination unit B1; the supercapacitor lamination unit B1 includes a supercapacitor cell structure Y2 formed by the positive electrode material, the separator and the negative electrode material for a supercapacitor; at the same time, when the materials of the positive electrode plate for a supercapacitor and the compatible negative electrode plate F1 are the same material, the supercapacitor lamination unit contains a symmetrical type supercapacitor cell structure Y2-D; when the positive electrode plate C and the compatible negative electrode plate F1 are made of non-identical supercapacitor active materials, the supercapacitor lamination unit contains an asymmetric supercapacitor cell structure Y2-F. The compatible negative plate F1 can also be replaced by a negative plate for a supercapacitor.

Exemplarily, in one embodiment of the present application, the positive electrode plate for a supercapacitor, the separator, and the negative electrode plate for a supercapacitor F3 can form a supercapacitor lamination unit B2; and the supercapacitor lamination unit B2 includes the supercapacitor cell structure Y2 formed by the positive electrode material, the separator and the negative electrode material for a supercapacitor.

At the same time, when the materials of the positive electrode plate for a supercapacitor and the negative electrode plate F3 for a supercapacitor are the same material, the supercapacitor lamination unit contains a symmetrical supercapacitor cell structure Y2-D; when the materials of the positive electrode plate for a supercapacitor and the negative electrode plate F3 for a supercapacitor are different material, the supercapacitor lamination unit contains the asymmetric supercapacitor cell structure Y2-F.

Those skilled in the art can understand that the above-mentioned battery units are only exemplary descriptions. According to the contents disclosed in this specification, those skilled in the art know how to select corresponding positive electrode plates and negative electrode plates to form a lithium-ion battery lamination unit or a supercapacitor stack. unit.

<Transition Unit>

Exemplarily, in one embodiment of the present application, the positive electrode plate L1 for a lithium-ion battery, the separator and the seventh negative electrode plate F5 can form a transition unit G1; the transition unit G1 includes a lithium-ion battery cell structure Y1 formed by a positive electrode material for a lithium-ion battery, a separator and a negative electrode material for a lithium-ion battery.

Exemplarily, in one embodiment of the present application, the positive electrode plate H for a lithium-ion battery and a supercapacitor, the separator and the compatible negative electrode plate F1 can form a transition unit G2; the transition unit G2 includes a lithium-ion battery cell structure Y1 formed by a positive electrode material for a lithium-ion battery, a separator and a negative electrode material for a lithium-ion battery, or a supercapacitor cell structure Y2 formed by a positive electrode material for a supercapacitor, a separator and a negative electrode material for a supercapacitor.

Exemplarily, in one embodiment of the present application, the positive electrode plate H for a lithium-ion battery and a supercapacitor, the separator and the seventh negative electrode plate F5 can form a transition unit G3; the transition unit G3 includes a lithium-ion battery cell structure Y1 formed by a positive electrode material for a lithium-ion battery, a separator and a negative electrode material for a lithium-ion battery, or a supercapacitor cell structure Y2 formed by a positive electrode material for a supercapacitor, a separator and a negative electrode material for a supercapacitor.

Exemplarily, in one embodiment of the present application, the positive electrode plate C1 for a supercapacitor, the separator and the seventh negative electrode plate F5 can form a transition unit G4; the transition unit G4 includes a supercapacitor cell structure Y2 formed by a positive electrode material for a supercapacitor, a separator and a negative electrode material for a capacitor.

Exemplarily, in one embodiment of the present application, the positive electrode plate H for a lithium-ion battery and a supercapacitor, the separator and the negative electrode plate F3 for a supercapacitor can form a transition unit G5; the transition unit G5 includes a supercapacitor cell structure Y2 formed by a positive electrode material for a supercapacitor, a separator, and a negative electrode material for a supercapacitor.

In the above solution, the positive electrode material of the lithium-ion battery needs to correspond to the compatible negative electrode material; the positive electrode material for a supercapacitor needs to correspond to the negative electrode material for a supercapacitor or the compatible negative electrode material.

In one solution of the present application, a separator is also arranged between the lithium-ion battery lamination unit, the supercapacitor lamination unit, and the transition unit to avoid the short circuit as a result of direct contact between the positive electrode material and the negative electrode material.

Exemplarily, in one solution of the present application, the separators arranged between the adjacent lithium-ion battery lamination units, supercapacitor lamination units and transition units can also form a lithium-ion battery cell structure Y1 or a supercapacitor cell structure Y2. Specifically, when the two sides of the separator are respectively the positive electrode material for a lithium-ion battery and the negative electrode material for a lithium-ion battery, the primary structure Y1 of lithium-ion battery can be formed; when the two sides of the separator are respectively the positive electrode material for a supercapacitor and a negative electrode material for a supercapacitor, the supercapacitor cell structure Y2 can be formed.

In one solution of the present application, in the composite battery according to the example of the present application, the number of the lithium-ion battery cell structures Y1 is greater than or equal to the number of the supercapacitor cell structures Y2.

<The Stacking of Positive and Negative Electrodes in a Composite Battery>

In one embodiment of the present application, the composite battery includes at least one of a lithium-ion battery lamination unit A1, a supercapacitor lamination unit B1, a supercapacitor lamination unit B2, and transition units G1, G2, G3, G4, and G5; and at the same time ensure that the composite battery includes at least one positive electrode plate for a lithium-ion battery and at least one positive electrode plate for a supercapacitor; and/or, at least one positive electrode plate H for a lithium-ion battery and a supercapacitor.

In one solution of the present application, the lithium-ion battery lamination unit A1, the supercapacitor lamination unit B1, and the supercapacitor lamination unit B2 can be transitionally connected through a separator and an optional transition unit to form a laminate type composite battery.

In the above solution, the transition connection should satisfy that the positive electrode material for a lithium-ion battery corresponds to the compatible negative electrode material; the positive electrode material for a supercapacitor corresponds to the negative electrode material for a supercapacitor or the compatible negative electrode material.

In an exemplary solution, the composite battery includes transition units-m lithium-ion battery lamination units A1-transition units; wherein the transition units are the same or different, and are independently selected from the above transition units G1-G5, m is an integer greater than or equal to 1.

In an exemplary solution, the composite battery includes transition units-n supercapacitor lamination units B1-transition units; the transition units are the same or different, and are independently selected from the above transition units G1-G5, and n is an integer greater than or equal to 1.

In an exemplary solution, the composite battery includes transition units-n supercapacitor lamination units B2-transition units; wherein the transition units are the same or different, and are independently selected from the above transition units G1-G5, and n is an integer greater than or equal to 1.

In an exemplary solution, the composite battery includes transition units-n1 supercapacitor lamination units B1-n2 supercapacitor lamination units B2-transition units; wherein the transition units are the same or different, and are independently selected from each other. For the above transition units G1-G5, n1 is an integer greater than or equal to 1, and n2 is an integer greater than or equal to 1.

In an exemplary solution, the composite battery includes transition units-m lithium-ion battery lamination units A1-transition units-n supercapacitor lamination units B1-transition units; wherein the transition units are the same or different, and are independently selected from the above transition units G1-G5, n is an integer greater than or equal to 1, m is an integer greater than or equal to 1.

In an exemplary solution, the composite battery includes transition units-m lithium-ion battery lamination units A1-transition units-n supercapacitor lamination units B2-transition units; wherein the transition units are the same or different, and are independently selected from the above transition units G1-G5, n is an integer greater than or equal to 1, m is an integer greater than or equal to 1.

In an exemplary solution, the composite battery includes transition units-n1 supercapacitor lamination units B1-transition unit-m lithium-ion battery lamination units A1-transition unit-n2 supercapacitor lamination units B2-transition unit; the transition units are the same or different, and are independently selected from the above transition units G1-G5, n1+n2 is an integer greater than or equal to 1, and m is an integer greater than or equal to 1.

In the above exemplary solution, the transition unit can select a suitable transition unit from the above transition units G1-G5 according to the difference of adjacent repeating units, so as to ensure that the positive electrode material of the lithium-ion battery needs to correspond to the compatible negative electrode material; the positive electrode material for a supercapacitor needs to correspond to the negative electrode material for a supercapacitor or compatible negative electrode material.

In the above exemplary solution, if x lithium-ion battery cell structures Y1 and y supercapacitor cell structures Y2 are included at the same time, the applicable range and application of the composite battery can be adjusted by adjusting the ratio of x/y. For example, when the ratio of x/y is larger, the energy density of the composite battery is higher; the ratio of x/y is closer to 1, the power density of the composite battery is higher. The ratio of x/y can be adjusted according to the requirements of energy density and power density in a wide range of application environments, so as to meet the application requirements. In the present application, $x \geq y \geq 1$. That is, the number of the supercapacitor cell structures Y2 is less than or equal to the number of the lithium-ion battery cell structures Y1.

<Separator>

In one example of the present application, the separator is selected from porous films.

The separator is prepared from a separator material that is ionically conductive but electronically insulating, and the separator is mostly a porous film made of a polymer.

In some examples, the polymers include, but are not limited to: polyethylene terephthalate, polybutylene terephthalate, polyether, polyacetal, polyamide, polycarbonate, polyimide, polyether ether ketone, polyether sulfone, polyphenylene ether, polyphenylene sulfide, polyethylene naphthalene, high density polyethylene, low density polyethylene, linear low density polyethylene, ultra-high molecular weight polyethylene and polypropylene.

In some examples, the separator further includes an organic or inorganic coating arranged on one or both surfaces of the above-mentioned porous membrane. An organic or inorganic coating applied to the surface of a substrate, usually to enhance the resistivity of the separator, prevents direct electrical contact between opposing layers of negative electrode material and layers of positive electrode material, and remains available for immersion electrolysis insulator material of porous structure that transports lithium-ions between battery electrodes. The insulating separator can be in the form of a plate adapted to the structure of the battery, or can be in the form of a bag adapted to the structure of the battery.

In some examples, the inorganic substances may specifically include but are not limited to: $BaTiO_3$, $Pb(Zr, Ti)O_3$ (PZT), $Pb_{1-x}La_xZr_{1-y}Ti_yO_3$, $PB(Mg_3Nb_{2/3})O_3$—$PbTiO_3$, hafnium dioxide ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ and mixtures thereof.

In some examples, the organic matter may specifically include, but is not limited to: Cyanoethyl pullulan, cyanoethyl polyvinyl alcohol, cyanoethyl cellulose, cyanoethyl sucrose, polyvinylidene fluoride-co-hexafluoropropylene, polyvinylidene fluoride-co-trichloroethylene, polyvinylidene fluoride-co-trichloroethylene methyl methacrylate, polyacrylonitrile, polyvinylpyrrolidone, polyvinyl acetate, polyethylene-co-vinyl acetate, polyimide, polyethylene oxide, cellulose acetate, cellulose acetate butyrate and acetic acid cellulose propionate and mixtures thereof.

<Composite Battery>

In one embodiment of the present application, the composite battery includes a positive electrode plate for a lithium-ion battery, a positive electrode plate for a supercapacitor, a positive electrode plate for a lithium-ion battery and a supercapacitor, and a negative electrode plate. The above-mentioned positive electrode plate and negative electrode plate are assembled with tabs, separator, electrolyte, and packaging shell to form a finished battery cell.

<Electrolyte>

In one embodiment of the present application, the electrolyte solution includes a lithium salt, an organic solvent and an additive.

In some examples, the organic solvent is selected from carbonates (such as cyclic carbonates, chain carbonates), carboxylates (such as cyclic carboxylates, chain carboxylates), ether compounds (such as at least one of cyclic ether compounds, chain ether compounds), phosphorus-containing compounds and sulfur-containing compounds.

The carbonate is at least one selected from the group consisting of dimethyl carbonate, ethyl methyl carbonate, diethyl carbonate, methyl-n-propyl carbonate, ethyl-n-propyl carbonate, di-n-propyl carbonate, bis(fluoromethyl)) carbonate, bis(difluoromethyl)carbonate, bis(trifluoromethyl)

carbonate, bis(2-fluoroethyl)carbonate, bis(2,2-difluoroethyl)carbonate, bis(2,2-difluoroethyl)carbonate (2,2,2-Trifluoroethyl)carbonate, 2-fluoroethylmethylcarbonate, 2,2-difluoroethylmethylcarbonate and 2,2,2-trifluoroethylmethylcarbonate.

The carboxylate is at least one selected from the group consisting of methyl acetate, ethyl acetate, propyl acetate, isopropyl acetate, butyl acetate, sec-butyl acetate, isobutyl acetate, tert-butyl acetate, methyl propionate, Ethyl propionate, propyl propionate, isopropyl propionate, methyl butyrate, ethyl butyrate, propyl butyrate, methyl isobutyrate, ethyl isobutyrate, methyl valerate, valeric acid Ethyl, methyl and ethyl pivalate, methyl trifluoroacetate, ethyl trifluoroacetate, propyl trifluoroacetate, butyl trifluoroacetate, trifluoroacetic acid and 2,2,2-trifluoroacetate fluoroethyl esters.

The ether compound is at least one selected from the group consisting of tetrahydrofuran, 2-methyltetrahydrofuran, 1,3-dioxolane, 2-methyl-1,3-dioxolane, 4-methyl 1,3-dioxolane pentane, 1,3-dioxane, 1,4-dioxane, dimethoxypropane, dimethoxymethane, 1,1-dimethoxyethane, 1,2-dimethyl Oxyethane, diethoxymethane, 1,1-diethoxyethane, 1,2-diethoxyethane, ethoxymethoxymethane, 1,1-ethoxymethoxy ethyl ethane and 1,2-ethoxymethoxyethane.

The phosphorus-containing compound is at least one selected from the group consisting of trimethyl phosphate, triethyl phosphate, dimethyl ethyl phosphate, methyl diethyl phosphate, ethylene methyl phosphate, ethylene ethyl phosphate, triphenyl phosphate ester, trimethyl phosphite, triethyl phosphite, triphenyl phosphite, tris(2,2,2-trifluoroethyl) phosphate and tris(2,2,3,3,3-pentaphosphate) fluoropropyl esters.

The sulfur-containing compound is at least one selected from the group consisting of sulfolane, 2-methyl sulfolane, 3-methyl sulfolane, dimethyl sulfone, diethyl sulfone, ethyl methyl sulfone, methyl propyl sulfone, dimethyl sulfoxide, at least one of methyl methanesulfonate, ethyl methanesulfonate, methyl ethanesulfonate, ethyl ethanesulfonate, dimethyl sulfate, diethyl sulfate and dibutyl sulfate.

In some examples, the organic solvent accounts for 82-88% of the total mass of the electrolyte.

In one embodiment of the present application, the lithium salt is at least one selected from the group consisting of inorganic lithium salts, fluorine-containing organic lithium salts, and dicarboxylic acid complex-containing lithium salts.

The inorganic lithium salt is at least one selected from the group consisting of $LiClO_4$, $LiAsF_6$, $LiPF_6$, $LiBF_4$, $LiSbF_6$, $LiSO_3F$, $LiN(FSO_2)_2$.

The fluorine-containing organic lithium salt is selected from $LiCF_3SO_3$, $LiN(FSO_2)(CF_3SO_2)$, $LiN(CF_3SO_2)_2$, $LiNC_2F_5SO_2)_2$, cyclic lithium 1,3-hexafluoropropanedisulfonimide, cyclic lithium 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, etc.

The lithium salt containing dicarboxylic acid complex is at least one selected from the group consisting of lithium bis(oxalato)borate, lithium difluorooxalatoborate, lithium tris(oxalato)phosphate, lithium difluorobis(oxalato)phosphate and tetrafluoro(oxalato) lithium phosphate.

In some examples, the lithium salt accounts for 13-18 wt % of the total mass of the electrolyte.

In one example of the present application, the additives are conventional additives known in the art.

<Preparation Method of Composite Battery>

Exemplarily, the present application also provides a method for preparing the above-mentioned composite battery, the method including the following steps:
(1) preparing a positive electrode plate for a lithium-ion battery and a positive electrode plate for a supercapacitor; and/or, preparing a positive electrode plate for a lithium-ion battery and a supercapacitor;
(2) preparing a negative electrode plate;
(3) drawing two independent positive electrode tabs from the positive electrode plate for a lithium-ion battery and the positive electrode plate for a supercapacitor, or drawing two independent positive electrode tabs from the positive electrode plates for a lithium-ion battery and a supercapacitor respectively; drawing a negative electrode tab from the negative electrode plate to form a three-tab structure with two mutually independent positive electrode tabs and a shared negative electrode tab;
(4) alternately stacking a negative electrode plate, a separator, a positive electrode plate, a separator, and a negative electrode plate to form a composite battery.

In one embodiment of the present application, the positive electrode plate for a supercapacitor can be prepared by the following method:

The positive electrode slurry for a supercapacitor was prepared and coated on one or both sides of the positive electrode current collector for a supercapacitor to prepare the positive electrode plate for a supercapacitor.

In one embodiment of the present application, the positive electrode plate for the lithium-ion battery can be prepared by the following method:

The positive electrode slurry for lithium-ion battery was prepared and coated on one side or both sides of the positive electrode current collector for lithium-ion battery to prepare the positive electrode plate for a lithium-ion battery.

In one embodiment of the present application, the positive electrode plates for a lithium-ion battery and a supercapacitor can be prepared by the following methods:

The positive electrode slurry for a lithium-ion battery and the positive electrode slurry for a supercapacitor were prepared, and were respectively coated on the surface of one side of the positive electrode current collector for a lithium-ion battery and a supercapacitor to prepare a positive electrode plate for a lithium-ion battery and a supercapacitor.

Figure 7:
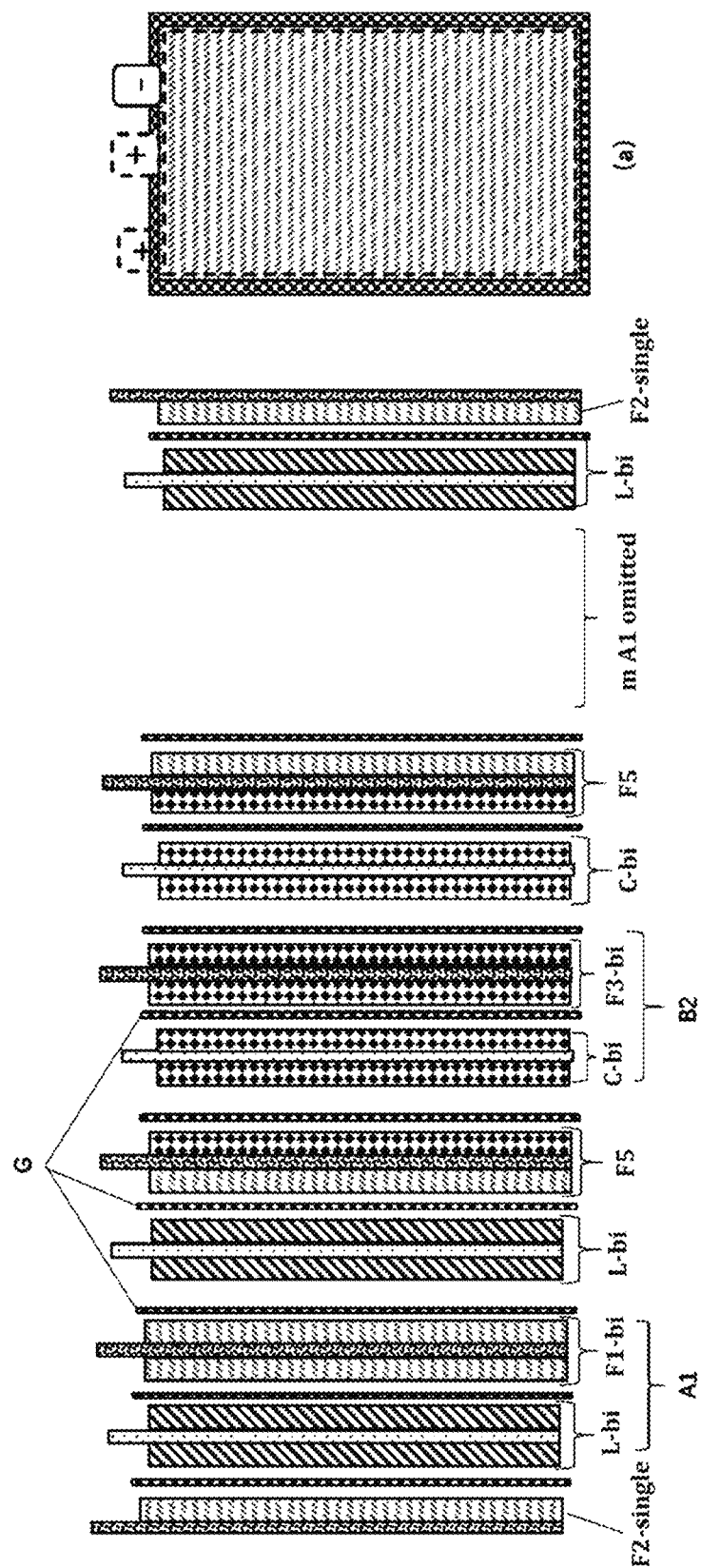
FIG. 7 is a schematic diagram of a composite battery containing a symmetric supercapacitor according to an example of the present application, and (a) is a front view of the battery.
Figure 8:
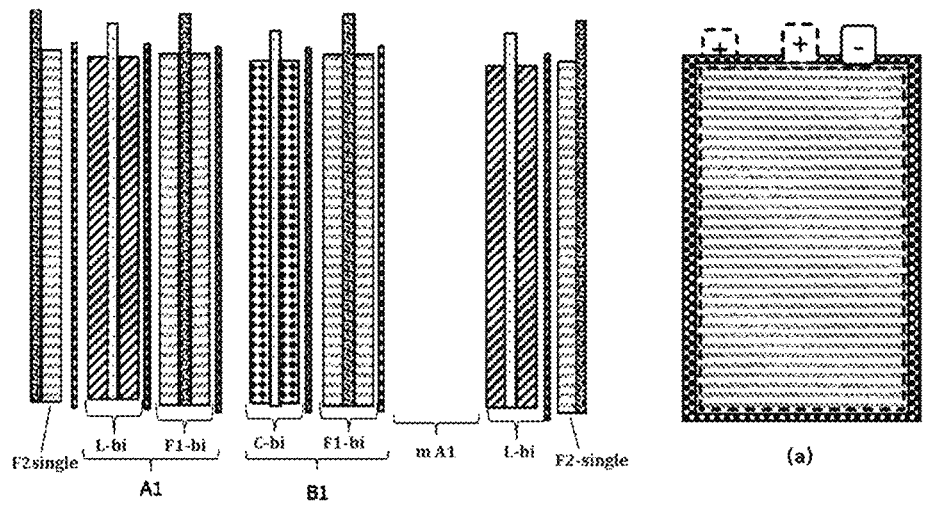
FIG. 8 is a schematic diagram of a composite battery containing an asymmetric supercapacitor according to an example of the present application, and (a) is a front view of the battery.
Figure 9:
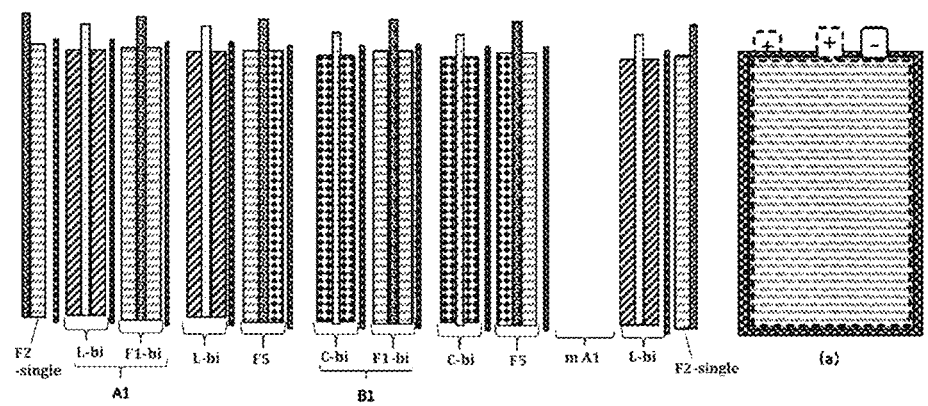
FIG. 9 is a schematic diagram of a composite battery including an asymmetric supercapacitor and a symmetric supercapacitor according to an example of the present application, and (a) is a front view of the battery.

In an example of the present application, a composite battery was formed by alternately stacking a negative electrode plate, a separator G, a positive electrode plate, a separator G, and a negative electrode plate, as shown in FIG. 7, FIG. 8 and FIG. 9.

FIG. 7 is a schematic diagram of a composite capacitor containing a symmetric supercapacitor according to an example of the present application, and its stacking method is F2-single, separator, (L-bi, separator, F1-bi, separator), (L-bi, separator, F5, separator), (C-bi, separator, F3-bi, separator), (C-bi, separator, F5, separator), m (L-bi, separator, F1-bi, separator), L-bi, separator, and F2-single are alternately combined. The separator adopts Z-type lamination, and the positive and negative electrodes are separated and stacked to form a bare cell, which contains A1-G1-B2-G4-(A1)$_m$; wherein the F2-single, the separator, and the L-bi include the lithium-ion battery cell structure Y1; the lithium-ion battery lamination unit A1 includes the lithium-ion cell structure Y1; a lithium-ion battery cell structure Y1 is formed between A1-G1; the transition unit G1 includes a lithium-ion cell structure Y1; a supercapacitor cell structure Y2 is formed between G1-B2; the supercapacitor lamination unit B2 includes a supercapacitor cell structure Y2; the supercapacitor cell structure Y2 is formed between B2-G4; the supercapacitor cell structure Y2 is included in the transition unit G4; the lithium-ion battery cell structure Y1 is formed between G4-A1; the lithium-ion The battery lamination unit A1 includes a lithium-ion battery cell structure Y1; a lithium-ion cell structure Y1 is formed between A1-A1; and L-bi, separator, and F2-single include a lithium-ion cell structure Y1.

FIG. 8 is a schematic diagram of a composite capacitor containing an asymmetrical supercapacitor according to an example of the present application, and its stacking method is F2-single, separator, (L-bi, separator, F1-bi, separator), (C-bi, separator, F1-B1, separator), m (L-bi, separator, F1-bi, separator), L-bi, separator, F2-single are alternately combined; the separator adopts Z-type lamination, the positive and negative electrodes are separated and stacked to form a bare cell to form a stacked structure containing A1-B1-(A1)$_m$; wherein F2-single, separator, and L-bi include a lithium-ion battery cell structure Y1; the lithium-ion battery lamination unit A1 includes the lithium-ion cell structure Y1; the supercapacitor cell structure Y2 is formed between A1 and B1; the supercapacitor cell structure Y2 is included in the supercapacitor lamination unit B1; lithium-ion battery cell structure Y1 is formed between B1-A1; the lithium-ion cell lamination unit A1 includes a lithium-ion cell structure Y1; lithium-ion cell structure Y1 is formed between A1-A1; L-bi, The separator, F2-single, includes the lithium-ion battery cell structure Y1.

FIG. 9 is a schematic diagram of a composite capacitor containing asymmetric supercapacitors and symmetric supercapacitors according to an example of the present application, and the stacking method is F2-single, separator, (L-bi, separator, F1-bi, separator), (L-bi, separator, F5, separator), (C-bi, separator, F1-bi, separator), (C-bi, separator, F5, separator), m (L-bi, separator F1-bi, separator), L-bi, separator, and F2-single are alternately combined; the separator adopts Z-type lamination; the positive and negative electrodes are separated and stacked to form a bare cell to form a stacked structure containing A1-G1-B1-G4-(A1)$_m$; wherein. F2-single, separator, and L-bi include lithium-ion battery cell structure Y1; the lithium-ion battery lamination unit A1 includes the lithium-ion battery cell structure Y1; a lithium-ion cell structure Y1 is formed between A1-G1; a lithium-ion cell structure Y1 is included in the transition unit G1; a supercapacitor cell structure Y2 is formed between G1-B1; the supercapacitor lamination unit B1 includes a supercapacitor cell structure Y2; a supercapacitor cell structure Y2 is formed between B1-G4; the transition unit G4 includes a supercapacitor cell structure Y2; a lithium-ion battery cell structure Y1 is formed between G4-A1; the lithium-ion battery lamination unit A1 includes a lithium-ion battery cell structure Y1; lithium-ion battery cell structure Y1 is formed between A1-A1; and L-bi, separator, F2-single include lithium-ion battery cell structure Y1.

In one solution of the present application, two independent positive electrode tabs were drawn from the positive electrode plate for a lithium-ion battery and the positive electrode plate for a supercapacitor, or two independent positive electrode tabs were drawn from the positive electrode plates for a lithium-ion battery and a supercapacitor respectively. A negative electrode tab was drawn from the negative electrode plate to form a three-tab structure with two independent positive electrode tabs and a shared negative electrode tab which can effectively solve the problem of fast self-discharge of supercapacitor batteries, and to achieve the purpose of optimal use of the composite electrochemical cell.

In one solution of the present application, the first positive electrode tab was drawn from the positive electrode plate for a supercapacitor; the second positive electrode tab was drawn from the positive electrode plate for a lithium-ion battery; the first positive electrode tab and the second positive electrode tab were drawn from the positive electrode plate for a lithium-ion battery and a supercapacitor. When using multiple positive electrode tabs for a lithium-ion battery and a supercapacitor, some of the positive electrode tabs can also lead out the first positive electrode tab, and some positive electrode tabs can lead out the second positive electrode tab.

In one solution of the present application, the negative electrode tabs were drawn out independently or cross-connectedly to form negative electrode tabs.

Figure 10:
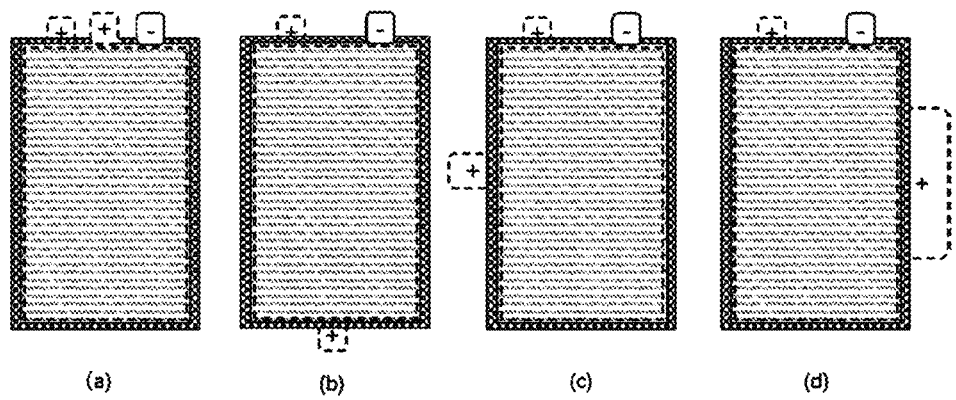
FIG. 10 is a schematic diagram of a tab structure of a composite battery according to an example of the present application.

The positions of the above-mentioned three tabs are not particularly limited. As shown in FIG. 10, for example, the first positive electrode tab connected to the positive electrode plate of the supercapacitor and the second positive electrode tab connected to the positive electrode plate of the lithium-ion battery were arranged in the same side of the battery (as shown in (a) of FIG. 10), or, the first positive electrode tab and the second positive electrode tab are arranged on opposite sides of the battery (as shown in b of FIG. 10), or the first positive electrode tab and the second positive electrode tab are arranged on adjacent two sides of the battery (as shown in (c) and (d) of FIG. 10). When the two positive electrode tabs are arranged on adjacent two sides of the battery, the width of the positive electrode tab can be appropriately increased according to different use environments, and the positive electrode tab can be used as an excellent heat conduction medium, which can improve the heat dissipation effect of the battery.

The preparation method of the present application will be described in further detail below with reference to specific examples. It should be understood that the following examples are only for illustrating and explaining the present application, and should not be construed as limiting the protection scope of the present application. All technologies implemented based on the above content of the present application are covered within the intended protection scope of the present application.

The experimental methods used in the following examples are conventional methods unless otherwise specified; the reagents, materials, etc. used in the following examples can be obtained from commercial sources unless otherwise specified.

Preparation Example 1: Positive Electrode Plate for a Supercapacitor

The porous carbon activated carbon powder (specific surface area ≥1000 m$^2$/g, a positive active material for a supercapacitor), binder PVDF, conductive carbon black, and carbon nanotubes were mixed and dispersed in NMP (N-methylpyrrolidone), and were further stirred under vacuum to obtain the positive electrode slurry for a supercapacitor with a uniform dispersion. The solid content contains 93 wt % of positive active material, 4 wt % of binder PVDF, 2 wt % of conductive carbon black and 1 wt % of carbon nanotubes. The total solids content in the positive electrode slurry for a supercapacitor was 40 wt %.

The positive electrode slurry for a supercapacitor was evenly coated on both sides of the aluminum foil, vacuum-dried at 100-120° C. for 10 to 24 h, and rolled to be compacted to 1.0 to 2.1 g/cm³ to obtain several positive electrode plates for supercapacitors C1, denoted as C-bi (as shown in (c) in FIG. 1).

The positive electrode slurry for supercapacitors was evenly coated on one side of the aluminum foil, vacuum-dried at 100-120° C. for 10 to 24 hours, and rolled to be compacted to 0.9 to 2.1 g/cm³ to obtain a number of positive electrode plates for supercapacitors C2, denoted as C-single (as shown in (b) in FIG. 1).

Preparation Example 2: Positive Electrode Plate for a Lithium-Ion Battery

The positive electrode active material for a lithium-ion battery (LiNi$_{0.8}$Co$_{0.1}$Mn 0.1O$_2$), binder PVDF, conductive carbon black, and carbon nanotubes are mixed and dispersed in NMP. After mixing, vacuum stirring was performed to obtain a uniform dispersion to prepare positive electrode slurry for a lithium-ion battery. The solid content contains 94 wt % of positive active material, 3 wt % of binder PVDF, 2 wt % of conductive carbon black and 1 wt % of carbon nanotubes. The total solid content in the positive electrode slurry for a lithium-ion battery was 70 wt %.

The positive electrode slurry for lithium-ion battery was evenly coated on both sides of the aluminum foil, vacuum dried at 100 to 120° C. for 10-24 h, and rolled and compacted to be 2 to 4.8 g/cm³ to obtain the positive electrode plate for a lithium-ion battery L1, denoted as L-bi (as shown in (c) of FIG. 2).

The positive electrode slurry for lithium-ion battery was evenly coated on one side of the aluminum foil, vacuum dried at 100 to 120° C. for 10 to 24 h, and rolled and compacted to be 2 to 4.8 g/cm³ to obtain a positive electrode plate for a lithium-ion battery L2, denoted as L-single (as shown in (b) of FIG. 2).

Preparation Example 3: Positive Electrode Plate H for a Lithium-Ion Battery and a Supercapacitor The positive electrode slurry for a supercapacitor of Preparation Example 1 and the positive electrode slurry for a lithium-ion battery of Preparation Example 2 were respectively evenly coated on two sides of the aluminum foil, vacuum dried at 100 to 120° C. for 10 to 24 h, and rolled and compacted to be 0.9 to 3.8 g/cm³ to obtain the positive electrode plate H for a lithium-ion battery and a supercapacitor (as shown in FIG. 3).

Preparation Example 4: Compatible Negative Electrode Plate 95 wt % artificial graphite, 2 wt % binder SBR (polystyrene butadiene copolymer) and 3 wt % conductive agent conductive carbon black were mixed in deionized water, stirred and dispersed uniformly to obtain compatible negative electrode slurry. The solid content in the compatible negative electrode slurry is 45 to 55 wt %.

The compatible negative electrode slurry was evenly coated on both sides of the copper foil, vacuum dried at 100 to 120° C. for 10 to 24 h, and rolled and compacted to be 0.9 to 2.1 g/cm³ to obtain some compatible negative plates F1, denoted as F1-bi (As shown in (c) of FIG. 4).

The compatible negative electrode slurry was evenly coated on one side of the copper foil, vacuum dried at 100 to 120° C. for 10 to 24 h, and rolled and compacted to be 0.9 to 2.1 g/cm³ to obtain some compatible negative plates F2, denoted as F2-single (As shown in (b) of FIG. 4).

Preparation Example 5: Seventh Negative Electrode Plate

Porous carbon activated carbon powder (specific surface area ≥1000 m²/g, a negative active material for a supercapacitor), binder PVDF, conductive carbon black, and carbon nanotubes were mixed and dispersed in NMP (N-methylpyrrolidone), and were further stirred under vacuum to obtain the negative electrode slurry for a supercapacitor with a uniform dispersion. The solid content contains 93 wt % of negative active material, 4 wt % of binder PVDF, 2 wt % of conductive carbon black and 1 wt % of carbon nanotubes. The total solids content in the negative electrode slurry for a supercapacitor was 40 wt %.

The negative electrode slurry for a supercapacitor and the compatible negative electrode slurry of Preparation Example 4 were respectively evenly coated on two sides of the copper foil, vacuum dried at 100 to 120° C. for 10 to 24 h, and rolled and compacted to be 0.9 to 2.1 g/cm³ to obtain several seventh negative plates F5 (as shown in FIG. 5).

Preparation Example 6: Negative Electrode Plate for a Supercapacitor

The negative electrode slurry for supercapacitor of Preparation Example 5 was evenly coated on both sides of the copper foil, and vacuum dried at 100 to 120° C. for 10 to 24 h, and rolled and compacted to be 0.9 to 2.1 g/cm³ to obtain some supercapacitor negative plates F3, denoted as F3-bi (as shown in (c) of FIG. 6).

The negative electrode slurry for supercapacitor of Preparation Example 5 was evenly coated on one side of the copper foil, vacuum dried at 100 to 120° C. for 10 to 24 h, and rolled and compacted to be 0.9 to 2.1 g/cm³ to obtain some supercapacitor negative plates for a supercapacitor F4, denoted as F4-single (as shown in (b) of FIG. 6).

Example 1: Combination of a Lithium-Ion Battery and a Symmetrical Supercapacitor The positive electrode plate of the above-mentioned preparation examples 1 to 3 were punched into 60 mm×45 mm plates respectively; the negative electrode plates of the above-mentioned preparation examples 4 to 6 were punched into 62 mm×47 mm plates respectively;

The positive electrode plate and the negative electrode plate were combined as: F2-single, separator, (L-bi, separator, F1-bi, separator), (L-bi, separator, F5, separator), 2 (C-bi, separator, F3-bi, separator), (C-bi, separator, F5, separator), (L-bi, separator, F1-bi, separator), L-bi, separator, F2-single. One surface of the transitional negative electrode F5 was provided with a negative electrode material for a supercapacitor, the other surface is provided with a negative electrode material for a lithium-ion battery, thus forming a stacked structure containing A1-G1-(B2)$_2$-G4-A1. The active materials of the negative electrode material for a supercapacitor and the positive electrode material for a supercapacitor are the same. F2-single, separator and L-bi include a lithium-ion battery cell structure Y1; the lithium-ion battery lamination unit A1 includes the lithium-ion cell structure Y1; a lithium-ion cell structure Y1 is formed between A1-G1; the transition unit G1 includes a lithium-ion battery cell structure Y1; a supercapacitor cell structure Y2 is formed between G1-B2; the supercapacitor lamination unit B2 includes a supercapacitor cell structure Y2; the supercapacitor cell structure Y2 is formed between B2-B2; the supercapacitor lamination unit B2 includes a supercapacitor cell structure Y2; the supercapacitor cell structure Y2 was formed between B2-G4; the transition unit G4 includes a supercapacitor cell structure Y2; the lithium-ion battery cell structure Y1 was formed between G4-A1; the lithium-ion battery lamination unit A1 includes a lithium-ion battery cell structure Y1; F1-bi, separator, L-bi includes the lithium-ion battery cell structure Y1; and L-Bi, separator, F2-single include the lithium-ion battery cell structure Y1.

The separator made of polypropylene (PP) or polyethylene (PE) adopts Z-type lamination, and the positive and negative electrodes are separated and stacked to form a bare cell C-1. Then, two independent aluminum tabs were drawn from the positive electrode plate L for a lithium-ion battery and the positive electrode plate C for a supercapacitor in the bare cell C-1 respectively, and a nickel-plated copper tab or nickel tab was drawn from the negative electrode plate to form a three-tab bare cell C-1 with two mutually independent positive electrode tabs and one common negative electrode tab.

Then the bare cell was clamped with a glass clamp, the strength of the glass clamp is 100 MPa/m$^2$, vacuum dried at 85° C. for 24 hours, then packaged with aluminum plastic film. Furthermore, the electrolyte was added into the above cell and the cell was further packaged for forming and aging to obtain a soft package battery with a length, width and thickness of 70 mm×50 mm×7 mm. The electrolyte is a lithium hexafluorophosphate electrolyte of 1M, and the solvent of the electrolyte is a mixed solvent of ethylene carbonate: dimethyl carbonate: 1,2-propylene glycol carbonate with a volume ratio of 1:1:1.

Example 2: Combination of a Lithium-Ion Battery and an Asymmetric Supercapacitor Other operations were the same as in Example 1, except that:

The positive electrode plate and the negative electrode plate were alternatively combined as: F2-single, separator, 2 (L-bi, separator, F1-bi, separator), 3 (C-bi, separator, F1-bi, separator), 1 (L-bi, separator, F1-bi, separator), L-bi, separator, and F2-single to form a stacking structure containing $(A1)_2$-$(B1)_3$-$(A1)_1$. F2-single, separator and L-bi include a lithium-ion battery cell structure Y1; the lithium-ion battery lamination unit A1 includes the lithium-ion cell structure Y1; the lithium-ion cell structure Y1 was formed between A1-A1; the lithium-ion battery lamination unit A1 includes a lithium-ion battery cell structure Y1; a supercapacitor cell structure Y2 was formed between A1-B1; the supercapacitor cell structure B1 includes a supercapacitor cell structure Y2; a supercapacitor cell structure Y2 was formed between B1-B1; the supercapacitor lamination unit B1 includes a supercapacitor cell structure Y2; the supercapacitor cell structure Y2 was formed between B1-B1; the supercapacitor lamination unit B1 includes a supercapacitor cell structure Y2; the supercapacitor cell structure Y2 was formed between B1-A1; lithium-ion battery lamination unit A1 includes the lithium-ion battery cell structure Y1; F1-bi, separator, L-bi include the lithium-ion battery cell structure Y1; L-bi, separator, and F2-single include the lithium-ion battery cell structure Y1.

The separator made of polypropylene (PP) or polyethylene (PE) adopts Z-type lamination, and the positive and negative electrodes are separated and stacked to form a bare cell C-2. Then, two independent aluminum tabs were drawn from the positive electrode plate L for a lithium-ion battery and the positive electrode plate C for a supercapacitor in the bare cell C-2 respectively, a nickel-plated copper tab or nickel tab was drawn from the negative electrode plate to form a three-tab bare cell C-2 with two mutually independent positive electrode tabs and one common negative electrode tab.

Example 3: Combination of a Lithium-Ion Battery, a Symmetrical Supercapacitor, and an Asymmetrical Supercapacitor Other operations were the same as in Example 1, except that:

The positive electrode plate and negative electrode plate were combined as: F2-single, separator, (L-bi, separator, F1-bi, separator), (L-bi, separator, F5, separator), 2 (C-bi, separator, F1-bi, separator), (C-bi, separator, F5, separator), (L-bi, separator, F1-bi, separator), L-bi, separator, F2-single to form a stacking structure containing A1-G1-$(B1)_2$-G4-A1, wherein the F2-single, the separator, and the L-bi include the lithium-ion battery unit structure Y1; the lithium-ion battery lamination unit A1 includes the lithium-ion battery unit structure Y1; the lithium-ion battery cell structure Y1 was formed between A1-G1; the transition unit G1 includes a lithium-ion cell structure Y1; a supercapacitor cell structure Y2 was formed between G1-B1; the supercapacitor lamination unit B1 The supercapacitor cell structure Y2 was included; the supercapacitor cell structure Y2 was formed between B1-B1; the supercapacitor lamination unit B1 includes the supercapacitor cell structure Y2; the supercapacitor cell structure Y2was formed between B1-G4; the transition unit G4 includes a supercapacitor cell structure Y2; a lithium-ion battery cell structure Y1 was formed between G4-A1; the lithium-ion battery lamination unit A1 includes a lithium-ion battery cell structure Y1; F1-bi, Separator, L-bi include the lithium-ion battery cell structure Y1; L-Bi, Separator, F2-Single included the lithium-ion battery cell structure Y1.

The separator made of polypropylene (PP) or polyethylene (PE) adopts Z-type lamination, and the positive and negative electrodes are separated and stacked to form a bare cell C-3. Then, two independent aluminum tabs were drawn from the positive electrode plate L for a lithium-ion battery and the positive electrode plate C for a supercapacitor in the bare cell C-3 respectively, a nickel-plated copper tab or nickel tab was drawn from the negative electrode plate to form a three-tab bare cell C-3 with two mutually independent positive electrode tabs and one common negative electrode tab.

Comparative Example 1: Symmetrical Supercapacitor

Other operations were the same as in Example 1, except that:

The positive electrode plate and negative electrode plate were alternatively combined as: F4-single, separator, 7 (C-bi, separator, F3, separator), C-bi, separator, F4-single to form a stacking structure containing -$(B2)_7$- which contains 16 supercapacitor cell structures Y2.

The separator made of polypropylene (PP) or polyethylene (PE) adopts Z-type lamination, and the positive and negative electrodes were separated and stacked to form DBL-1 bare cell containing a symmetrical supercapacitor. Then, a aluminum tab was drawn from the positive electrode plate C for a supercapacitor in the bare cell DBL-1, and a nickel-plated copper tab or nickel tab was drawn from the negative electrode plate to form a two-pole tab bare cell DBL-1.

Comparative Example 2: Asymmetric Supercapacitor

Other operations were the same as in Example 1, except that:

The positive electrode plate and negative electrode plate were combined as: F2-single, separator, 7 (C-bi, separator, F1-bi, separator), C-bi, separator, F2-single to form a stacking structure containing -(B1)$_7$- which contains 16 supercapacitor cell structures Y2.

The separator made of polypropylene (PP) or polyethylene (PE) adopts Z-type lamination, and the positive and negative electrodes were separated and stacked to form DBL-2 bare cell containing a symmetrical supercapacitor. Then, a aluminum tab was drawn from the positive electrode plate C for a supercapacitor in the bare cell DBL-2, and a nickel-plated copper tab or nickel tab was drawn from the negative electrode plate to form a two-tab bare cell DBL-2.

Comparative Example 3: Lithium-Ion Battery

Other operations were the same as in Example 1, except that:

The positive electrode plate and negative electrode plate were alternatively combined as: F2-single, separator, 7 (L-bi, separator, F1-bi, separator), L-bi, separator, F2-single to form a stacking structure containing -(A1)$_7$- which contains 16 supercapacitor cell structures Y1.

The separator made of polypropylene (PP) or polyethylene (PE) adopts Z-type lamination, and the positive and negative electrodes were separated and stacked to form DBL-3 bare cell containing a symmetrical supercapacitor. Then, a aluminum tab was drawn from the positive electrode plate C for a supercapacitor in the bare cell DBL-3, and a nickel-plated copper tab or nickel tab was drawn from the negative electrode plate to form a two-pole tab bare cell DBL-3.

Comparative Example 4: Composite Lithium-Ion Battery, Asymmetric Supercapacitor Two-Tab Battery Other operations were the same as those in Example 2, except that:

The separator made of polypropylene (PP) or polyethylene (PE) adopts Z-type lamination, and the positive and negative electrodes are separated and stacked to form a bare cell DBL-4, and then the aluminum tabs drawn from the positive electrode plate L for a lithium-ion battery and the positive electrode plate C for a supercapacitor were welded to form a common positive electrode tab on the leading out end, the nickel-plated copper tab or nickel tab was drawn from the negative electrode plate to form a two-tab bare cell of DBL-4.

TABLE 1

Performance test results of capacitors prepared in Examples and Comparative Examples

| | Energy density (Wh/kg) (1 C-discharging) | Max power density (W/Kg) | Voltage (V) 10 C-discharging 10 s at −20° C. | Capacity retention rate (%) after 500 cycles of 1 C charging-discharging | Capacity retention rate (%) after being fully charged at 4.2 V for 60 days |
|---|---|---|---|---|---|
| Example 1 | 107.9 | 2763 | 2.85 | 96.83 | 47.1 |
| Example 2 | 102.4 | 2046 | 2.80 | 96.85 | 46.8 |
| Example 3 | 103.1 | 2092 | 2.78 | 96.78 | 47.2 |
| Comparative example 1 | 4.52 | 3791 | / | 99.91 | 5.2 |
| Comparative example 2 | 3.89 | 3167 | / | 99.86 | 6.3 |
| Comparative example 3 | 226 | 724 | 2.32 | 95.21 | 95.6 |
| Comparative example 4 | 102.5 | 2030 | 2.81 | 96.8 | 5.4 |

Obviously, according to Table 1, the "capacity retention rate (%) after being fully charged at 4.2V for 60 days" of the three-tab laminated composite battery of Examples 1 to 3 of the present application are significantly better than that of the two-tab laminated composite type battery (Comparative Example 4). When the supercapacitor is a symmetric supercapacitor (Example 1), its power density is significantly greater than that of an asymmetrical supercapacitor (Examples 2, 3).

The examples of the present application have been described above. However, the present application is not limited to the above-described examples. Any modification, equivalent replacement, improvement made within the spirit and principle of the present application shall be included within the protection scope of the present application.

What is claimed is:

1. A three-tab laminated composite battery, comprising a positive electrode plate, a negative electrode plate, a separator and an electrolyte, wherein the positive electrode plate and the negative electrode plate are alternately stacked, and adjacent positive electrode plate and negative electrode plate are separated by the separator; the positive electrode plate comprises a first positive electrode plate and a second positive electrode plate; the first positive electrode plate comprises a first positive electrode current collector and a positive electrode material for a supercapacitor arranged on both sides of the first positive electrode current collector; the second positive electrode plate comprises a second positive electrode current collector and a positive electrode material for a lithium-ion battery arranged on both sides of the second positive electrode current collector; the first positive electrode plate is connected to a first positive electrode tab; the second positive electrode plate is connected to a second positive tab; the first positive electrode tab and the second positive electrode tab are independent of each other; and the negative electrode plate is connected to a negative electrode tab.

2. The battery according to claim 1, wherein the positive electrode plate further comprises a third positive electrode plate; the third positive electrode plate comprises a third positive electrode current collector, a positive electrode material for a lithium-ion battery arranged on a first surface of the third positive electrode current collector, and a positive electrode material for a supercapacitor arranged on a second surface of the third positive electrode current collector opposite to the first surface; and the third positive electrode plate is connected to the first positive electrode tab or the second positive electrode tab.

3. The battery according to claim 1, wherein the positive electrode plate further comprises a fourth positive electrode plate; the fourth positive electrode plate comprises a fourth positive electrode current collector and a positive electrode material for a supercapacitor arranged on one surface of the fourth positive electrode current collector; the fourth positive electrode plate is arranged on the outermost layer of the composite battery; and the fourth positive electrode plate is connected to the first positive electrode tab.

4. The battery according to claim 1, wherein the positive electrode plate further comprises a fifth positive electrode plate; the fifth positive electrode plate comprises a fifth positive electrode current collector and a positive electrode material for a lithium-ion battery arranged on one surface of the fifth positive electrode current collector; the fifth positive electrode plate is arranged on the outermost layer of the composite battery; and the fifth positive electrode plate is connected to the second positive electrode tab.

5. The battery according to claim 1, wherein the negative electrode plate comprises a first negative electrode plate; the first negative electrode plate comprises a first negative electrode current collector and a bifunctional negative electrode material arranged on both sides of the first negative electrode current collector; and the bifunctional negative electrode material can adsorb/desorb lithium-ions, and can intercalate/de-intercalate lithium-ions of a lithium-ion battery.

6. The battery according to claim 1, wherein the negative electrode plate comprises a second negative electrode plate; the second negative electrode plate comprises a second negative electrode current collector and a bifunctional negative electrode material arranged on one side of the second negative electrode current collector; the bifunctional negative electrode material can adsorb/desorb lithium-ions, and can intercalate/de-intercalate lithium-ions of a lithium-ion battery; and the second negative electrode plate is arranged on the outermost layer of the composite battery.

7. The battery according to claim 1, wherein the negative electrode plate comprises a third negative electrode plate, and the third negative electrode plate comprises a third negative electrode current collector and a negative electrode material for a supercapacitor arranged on both sides of the third negative electrode current collector.

8. The battery according to claim 1, wherein the negative electrode plate comprises a fourth negative electrode plate; the fourth negative electrode plate comprises a fourth negative electrode current collector and a negative electrode material for a supercapacitor arranged on one side of the fourth negative electrode current collector; and the fourth negative electrode plate is arranged on the outermost layer of the composite battery.

9. The battery according to claim 1, wherein the negative electrode plate comprises a fifth negative electrode plate, and the fifth negative electrode plate comprises a fifth negative electrode current collector and a negative electrode material for a lithium-ion battery arranged on both sides of the fifth negative electrode current collector.

10. The battery according to claim 1, wherein the negative electrode plate comprises a sixth negative electrode plate; the sixth negative electrode plate comprises a sixth negative electrode current collector and a negative electrode material for a lithium-ion battery arranged on one side of the sixth negative electrode current collector; and the sixth negative electrode plate is arranged on the outermost layer of the composite battery.

11. The battery according to claim 1, wherein the negative electrode plate comprises a seventh negative electrode plate; the seventh negative electrode plate comprises a seventh negative electrode current collector, a first negative electrode material arranged on a first surface of the seventh negative electrode current collector, and a second negative electrode material on a second surface of the seventh negative electrode current collector opposite to the first surface; the first negative electrode material and the second negative electrode material both are one selected from the group consisting of the bifunctional negative electrode material, the negative electrode material for a supercapacitor and the negative electrode material for a lithium-ion battery; the first negative electrode material is different from the second negative electrode material; and the bifunctional negative electrode material can adsorb/desorb lithium-ions, and can intercalate/de-intercalate lithium-ions of a lithium-ion battery.

12. The battery according to claim 1, wherein the composite battery comprises at least one of a lithium-ion battery lamination unit A1, a supercapacitor lamination unit B1, a supercapacitor lamination unit B2, and transition units G1, G2, G3, G4, and G5; and at the same time ensure that the composite battery comprises at least one positive electrode plate for a lithium-ion battery and at least one positive electrode plate for a supercapacitor; and/or, at least one positive electrode plate for a lithium-ion battery and a supercapacitor; wherein:

the lithium-ion battery lamination unit A1 is formed by the second positive electrode plate, the separator and the first negative electrode plate;

the supercapacitor lamination unit B1 is formed by the first positive electrode plate, the separator and the first negative electrode plate;

the supercapacitor lamination unit B2 is formed by the first positive electrode plate, the separator, and the third negative electrode plate;

the transition unit G1 is formed by the second positive electrode plate, the separator and the seventh negative electrode plate;

the transition unit G2 is formed by the third positive electrode plate, the separator and the first negative electrode plate;

the transition unit G3 is formed by the third positive electrode plate, the separator and the seventh negative electrode plate;

the transition unit G4 is formed by the first positive electrode plate, the separator and the seventh negative electrode plate; and the transition unit G5 is formed by the third positive electrode plate, the separator and the third negative electrode plate.

13. The battery according to claim 12, wherein the composite battery comprises transition units-m lithium-ion battery lamination units A1-transition units; wherein the transition units are the same or different, and are independently selected from the above transition units G1-G5, m is an integer greater than or equal to 1.

14. The battery according to claim 12, wherein the composite battery comprises transition units-n supercapacitor lamination units B1-transition units; the transition units are the same or different, and are independently selected from the above transition units G1-G5, and n is an integer greater than or equal to 1.

15. The battery according to claim 12, wherein the composite battery comprises transition units-n supercapacitor lamination units B2-transition units; wherein the transition units are the same or different, and are independently selected from the above transition units G1-G5, and n is an integer greater than or equal to 1.

16. The battery according to claim 12, wherein the composite battery comprises transition units-n1 supercapacitor lamination units B1-n2 supercapacitor lamination units B2-transition units; wherein the transition units are the same or different, and are independently selected from each other; for the above transition units G1-G5, n1 is an integer greater than or equal to 1, and n2 is an integer greater than or equal to 1.

17. The battery according to claim 12, wherein the composite battery comprises transition units-m lithium-ion battery lamination units A1-transition units-n supercapacitor lamination units B1-transition units; wherein the transition units are the same or different, and are independently selected from the above transition units G1-G5, n is an integer greater than or equal to 1, m is an integer greater than or equal to 1.

18. The battery according to claim 12, wherein the composite battery comprises transition units-m lithium-ion battery lamination units A1-transition units-n supercapacitor lamination units B2-transition units; wherein the transition units are the same or different, and are independently selected from the above transition units G1-G5, n is an integer greater than or equal to 1, m is an integer greater than or equal to 1.

19. The battery according to claim 12, wherein the composite battery comprises transition units-n1 supercapacitor lamination units B1-transition unit-m lithium-ion battery lamination units A1-transition unit-n2 supercapacitor lamination units B2-transition unit; the transition units are the same or different, and are independently selected from the above transition units G1-G5, n1+n2 is an integer greater than or equal to 1, and m is an integer greater than or equal to 1.

20. The battery according to claim 12, wherein the composite battery comprises a stacked structure containing A1-G1-B2-G4-$(A1)_m$, or A1-B1-$(A1)_m$, or A1-G1-B1-G4-$(A1)_m$, and m is an integer greater than or equal to 1.

* * * * *